US012062001B2

(12) United States Patent
Gardner et al.

(10) Patent No.: US 12,062,001 B2
(45) Date of Patent: Aug. 13, 2024

(54) AUTOMATED WORKFLOWS ENABLING SELECTIVE INTERACTION WITH USERS

(71) Applicant: MicroStrategy Incorporated, Vienna, VA (US)

(72) Inventors: Richard Gardner, Leesburg, VA (US); Clayton Myers, Oak Hill, VA (US); Andrew Smith, Oakton, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 17/005,640

(22) Filed: Aug. 28, 2020

(65) Prior Publication Data
US 2021/0065078 A1 Mar. 4, 2021

Related U.S. Application Data

(60) Provisional application No. 62/894,315, filed on Aug. 30, 2019.

(51) Int. Cl.
*G06Q 10/00* (2023.01)
*G06F 16/9035* (2019.01)
(Continued)

(52) U.S. Cl.
CPC ..... *G06Q 10/0633* (2013.01); *G06F 16/9035* (2019.01); *G06F 16/958* (2019.01); *G06F 8/65* (2013.01)

(58) Field of Classification Search
CPC ......... G06Q 10/0633; G06Q 10/06395; G06Q 10/00; G06Q 10/02; G06Q 10/06;
(Continued)

(56) References Cited

U.S. PATENT DOCUMENTS 6,816,871 B2    11/2004    Lee
6,964,051 B1    11/2005    Palaniappan
(Continued)

OTHER PUBLICATIONS

Xu, Lida, et al. "Modelling and analysis techniques for cross-organizational workflow systems." Systems Research and Behavioral Science: The Official Journal of the International Federation for Systems Research 26.3 (2009): 367-389. (Year: 2009).*
(Continued)

*Primary Examiner* — Joseph M Waesco
(74) *Attorney, Agent, or Firm* — Fish & Richardson P.C.

(57) ABSTRACT

Methods, systems, and apparatus, including computer programs encoded on a computer storage medium, for automated workflows enabling selective interaction with users. In some implementations, a workflow module indicating a set of operations to be performed by one or more computers is accessed, where the workflow module specifies rules that instruct one or more actions to be selectively performed based on detection of one or more conditions. The occurrence of a particular condition specified by the workflow module is detected, where the workflow module is configured to initiate a communication when the particular condition occurs. In response to detecting the occurrence of the particular condition, a user is identified based on data of the workflow module, a communication corresponding to the particular condition is generated, and communication with the identified user is initiated to provide the generated message.

16 Claims, 7 Drawing Sheets

(51) Int. Cl.
*G06F 16/958* (2019.01)
*G06Q 10/0633* (2023.01)
*G06F 8/65* (2018.01)

(58) Field of Classification Search
CPC ...... G06Q 10/10; G06Q 30/02; G06F 16/958; G06F 16/9035; G06F 8/65; G05B 2219/31357
See application file for complete search history.

(56) References Cited

U.S. PATENT DOCUMENTS

| | | | |
|---|---|---|---|
| 7,552,438 B1 | 6/2009 | Werme et al. | |
| 7,581,011 B2 | 8/2009 | Teng | |
| 7,802,174 B2 | 9/2010 | Teng et al. | |
| 7,937,655 B2 | 5/2011 | Teng et al. | |
| 9,166,895 B1 | 10/2015 | Sivaraman | |
| 9,311,161 B2 | 4/2016 | Jagtap | |
| 9,436,535 B2 | 9/2016 | Ricken et al. | |
| 9,762,450 B2 | 9/2017 | Xie | |
| 9,811,849 B2 | 11/2017 | Bursey | |
| 10,803,411 B1 | 10/2020 | Smith et al. | |
| 10,810,041 B1 | 10/2020 | Myers et al. | |
| 10,997,135 B2 | 5/2021 | Zoll et al. | |
| 11,025,707 B1 | 6/2021 | Luker | |
| 11,102,330 B2 | 8/2021 | Gardner et al. | |
| 11,263,111 B2 | 3/2022 | Lang et al. | |
| 11,354,216 B2 | 6/2022 | Gardner et al. | |
| 11,409,644 B2 | 8/2022 | Carames et al. | |
| 2003/0135382 A1 | 7/2003 | Marejka et al. | |
| 2003/0220707 A1 | 11/2003 | Budinger et al. | |
| 2004/0060044 A1 | 3/2004 | Das et al. | |
| 2004/0068424 A1 | 4/2004 | Lee et al. | |
| 2007/0038931 A1* | 2/2007 | Allaire | G06Q 30/0601 715/208 |
| 2007/0226680 A1 | 9/2007 | Kumhyr et al. | |
| 2008/0115195 A1 | 5/2008 | Malek et al. | |
| 2008/0243902 A1 | 10/2008 | Rong et al. | |
| 2009/0044185 A1 | 2/2009 | Krivopaltsev | |
| 2009/0063699 A1 | 3/2009 | Chapweske et al. | |
| 2010/0162406 A1 | 6/2010 | Benameur et al. | |
| 2010/0250487 A1 | 9/2010 | Gabriel et al. | |
| 2010/0318986 A1 | 12/2010 | Burke et al. | |
| 2011/0055823 A1 | 3/2011 | Nichols et al. | |
| 2012/0054095 A1* | 3/2012 | Lesandro | G06F 9/452 705/39 |
| 2012/0124197 A1 | 5/2012 | Ghai et al. | |
| 2012/0198279 A1 | 8/2012 | Schroeder | |
| 2012/0290950 A1* | 11/2012 | Rapaport | H04L 12/1818 715/753 |
| 2013/0218618 A1* | 8/2013 | Purcell | G06Q 10/06 705/7.13 |
| 2014/0331209 A1 | 11/2014 | Singh | |
| 2015/0067687 A1 | 3/2015 | Turner | |
| 2015/0081574 A1 | 3/2015 | Selby et al. | |
| 2015/0089479 A1 | 3/2015 | Chen et al. | |
| 2015/0100829 A1 | 4/2015 | Nanjundappa et al. | |
| 2015/0178052 A1* | 6/2015 | Gupta | G06F 8/34 717/105 |
| 2015/0220426 A1 | 8/2015 | Spektor et al. | |
| 2015/0242636 A1 | 8/2015 | Khan et al. | |
| 2015/0287101 A1 | 10/2015 | Baldwin et al. | |
| 2015/0370540 A1 | 12/2015 | Coslovi et al. | |
| 2016/0026555 A1 | 1/2016 | Kuo et al. | |
| 2016/0072683 A1 | 3/2016 | Xie et al. | |
| 2016/0156738 A1* | 6/2016 | Kosecki | H04L 67/34 709/204 |
| 2016/0292599 A1 | 10/2016 | Andrews et al. | |
| 2016/0294614 A1* | 10/2016 | Searle | H04L 67/34 |
| 2016/0371170 A1 | 12/2016 | Salunke et al. | |
| 2016/0371622 A1* | 12/2016 | Kurian | G06Q 10/06316 |
| 2017/0034023 A1* | 2/2017 | Nickolov | H04L 43/0817 |
| 2017/0161105 A1* | 6/2017 | Barrett | G06F 9/4881 |
| 2017/0171097 A1* | 6/2017 | Dossing | H04L 67/10 |
| 2017/0315714 A1 | 11/2017 | Shyamsundar et al. | |
| 2017/0315981 A1 | 11/2017 | Shrestha et al. | |
| 2017/0329506 A1 | 11/2017 | Laetham et al. | |
| 2017/0372442 A1 | 12/2017 | Mejias | |
| 2018/0075202 A1* | 3/2018 | Davis | G06F 21/602 |
| 2018/0083995 A1* | 3/2018 | Sheth | G06F 16/958 |
| 2018/0114126 A1* | 4/2018 | Das | G06F 16/335 |
| 2018/0157466 A1* | 6/2018 | Jubran | G06F 8/00 |
| 2018/0267908 A1 | 9/2018 | Pan et al. | |
| 2018/0287902 A1 | 10/2018 | Chitalia et al. | |
| 2018/0314549 A1* | 11/2018 | Chokkalingam | H04L 41/5051 |
| 2018/0330293 A1* | 11/2018 | Kulkarni | G06K 7/10366 |
| 2019/0042900 A1* | 2/2019 | Smith | G06V 10/96 |
| 2019/0050229 A1 | 2/2019 | Chovel et al. | |
| 2019/0109822 A1 | 4/2019 | Clark et al. | |
| 2019/0213068 A1 | 7/2019 | Upadhyay | |
| 2019/0317829 A1 | 10/2019 | Brown et al. | |
| 2020/0019393 A1 | 1/2020 | Vichare et al. | |
| 2020/0034491 A1 | 1/2020 | Sangodkar et al. | |
| 2020/0119979 A1 | 4/2020 | Woodland et al. | |
| 2020/0204465 A1 | 6/2020 | Baker et al. | |
| 2020/0250897 A1 | 8/2020 | Wei et al. | |
| 2020/0257612 A1 | 8/2020 | Lang et al. | |
| 2020/0293436 A1 | 9/2020 | Carames et al. | |
| 2020/0366572 A1 | 11/2020 | Chauhan | |
| 2021/0064492 A1 | 3/2021 | Myers | |
| 2021/0067607 A1 | 3/2021 | Gardner et al. | |
| 2021/0073026 A1 | 3/2021 | Myers et al. | |
| 2021/0081298 A1 | 3/2021 | Gardner et al. | |
| 2021/0117243 A1 | 4/2021 | Ghafourifar | |
| 2021/0124610 A1 | 4/2021 | Gardner et al. | |

OTHER PUBLICATIONS

Interface Monitoring, Dec. 1, 2018, Science Direct, https://www.sciencedirect.com/topics/computer-science/interface-monitoring, p. 1-7. (Year: 2018).*
US Office Action in United States U.S. Appl. No. 16/557,482, dated Nov. 30, 2020, 13 pages.
US Office Action in United States U.S. Appl. No. 16/787,596 dated Nov. 25, 2020, 11 pages.
US Office Action in U.S. Appl. No. 16/815,788, dated Sep. 7, 2021, 27 pages.
US Office Action in U.S. Appl. No. 17/024,050, dated Aug. 19, 2021, 13 pages.
Notice of Allowance in U.S. Appl. No. 16/815,788, dated Mar. 31, 2022, 17 pages.
Office Action in U.S. Appl. No. 16/787,596, dated Nov. 1, 2021, 10 pages.
Office Action in U.S. Appl. No. 17/013,005, dated Nov. 24, 2021, 18 pages.
Office Action in U.S. Appl. No. 17/024,050, dated Feb. 1, 2022, 6 pages.
Office Action in U.S. Appl. No. 17/013,005, dated Jan. 24, 2023, 26 pages.
Office Action in U.S. Appl. No. 17/078,394, dated Feb. 3, 2023, 24 pages.
Office Action in U.S. Appl. No. 17/013,005, dated Jul. 21, 2022, 19 pages.
Office Action in U.S. Appl. No. 17/078,394, dated Sep. 14, 2022, 21 pages.
Office Action in U.S. Appl. No. 17/013,005, dated Oct. 12, 2023, 29 pages.
Office Action in U.S. Appl. No. 17/013,005, dated May 2, 2023, 29 pages.
Office Action in U.S. Appl. No. 17/078,394, dated Jun. 20, 2023, 7 pages.

* cited by examiner

Workflow Library 1

| Name | Purpose | Description | Security Permissions | Compatible Versions |
|---|---|---|---|---|
| Patching (Workflow 1) | Upgrade Software and/or Fix Known Software Errors | Check SW Version; Compare SW Version with a Current SW Version; Download a Patch if No Match; and Install the Patch if No Match | Full Control; and Modify | Versions 2.09 & Higher |
| Update Cache (Workflow 2) | Store New Data and/or Remove Old Data | Open Cache; Identify Data in the Cache; and Store New Data in the Cache and/or Remove Old Data from the Cache | Full Control; Modify; and Read & Execute | Versions 1.10 & Higher |
| ... | ... | ... | ... | ... |
| Import Data Source (Workflow 5) | Import New Data from a Source into a Destination | Open Source; Identify Data to Import; Determine the Destination; and Initiate Import of Identified Data from the Source to the Destination | Full Control; Modify; Read & Execute; and Write | Versions 1.10 & Higher |

FIG. 2

AUTOMATED WORKFLOWS ENABLING SELECTIVE INTERACTION WITH USERS

CROSS-REFERENCE TO RELATED APPLICATION

This application claims the benefit of U.S. Provisional Application No. 62/894,315, filed Aug. 30, 2019, and titled "AUTOMATED WORKFLOWS ENABLING SELECTIVE INTERACTION WITH USERS," which is incorporated by reference.

TECHNICAL FIELD

This disclosure generally relates to managing computer operation.

BACKGROUND

Servers and other computers experience a wide variety of conditions. Many computer systems require periodic or ongoing maintenance to ensure proper operation and to deal with errors and limitations.

SUMMARY

In some implementations, computing workflows can be defined to facilitate the management or operation of computer systems. The workflows can be packaged and distributed as redistributable modules that specify a set of operations for a computer to perform, along with rules, conditions, and other elements that affect the manner in which the operations are performed. The set of operations may be one or more operations, and in some cases includes one or more sequences of multiple operations.

Workflows can be configured to cause communication or interaction with human users besides causing the performance of other computer operations. These communications or other interactions may be initiated selectively by a computer system based on rules and/or conditions specified in a workflow package configured to be executed or interpreted by the computer system. For example, a server management workflow may cause a computer system to monitor performance of a server system and address errors that arise. The workflow may be configured to also interact with a user, such as an administrator for the server system, under certain conditions. For example, the server management workflow may specify that notifications should be sent by text message to mobile devices of one or more users when certain predetermined conditions are detected. As another example, the server management workflow may be configured to perform some operations automatically, but to request and require approval from a user before carrying out other operations.

In some implementations, an administrator can introduce human interaction components to workflow modules. These human interaction components may cause communication with a user when the workflow module is run, e.g., notifying one or more users, requiring user input, or otherwise communicating with one or more users. The one or more users may be individually specified users, users in a specific group of users (whose membership may change independent of the workflow module), or users that have a certain security or permission level.

In some implementations, a system provides an administrator an interface to modify operations within a workflow. For example, in modifying an operation within a workflow, the administrator may be able to add one or more conditions that limit when an operation is performed. Similarly, an administrator may be able to remove, replace, or modify a condition for a particular operation. As another example, the administrator may be able to add, replace, or modify one or more elements of an operation. The administrator may be able to specify specific users, a group of users, e.g., administrators, developers, managers, etc., security or permissions levels, e.g., full control permission, read/write or modify permission, read or view permission, etc., identification information of one or more users, e.g., names, employee ID's, etc., contact information of one or more users, e.g., one or more phone numbers, one or more emails, etc., or messaging methods or platforms, e.g., SMS text, email, dashboard notification, etc. The administrator may be able to modify elements through, for example, one or more dropdown menus, one or more text fields, or a combination of dropdown menus and text fields.

In one general aspect, a method performed by one or more computers, the method includes: accessing, by the one or more computers, a workflow module indicating a set of operations to be performed by one or more computers, the workflow module specifying rules that instruct one or more actions to be selectively performed based on detection of one or more conditions; detecting, by the one or more computers and as part of performance of the set of operations of the workflow module, the occurrence of a particular condition specified by the workflow module, where the workflow module is configured to initiate communication (e.g., with a user, with a device associated with a user, through an electronic address for a user, etc.) when the particular condition occurs; and in response to detecting the occurrence of the particular condition: identifying, by the one or more computers, a user based on data of the workflow module; generating, by the one or more computers, a message (e.g., a notification, alert, or other message) corresponding to the particular condition; and initiating, by the one or more computers, communication with the identified user to provide the generated message.

Implementations may include one or more of the following features. For example, in some implementations, the particular condition is that a performance measure for the operations of the workflow module is below a threshold level.

In some implementations, the particular condition is that a performance measure for the one or more computers is below a threshold level.

In some implementations, the workflow module is configured to run periodically or on an ongoing basis to detect and address one or more aspects of operation of a computer system.

In some implementations, the workflow module is editable by a user to alter (i) the particular condition, (ii) the type of interaction to the user, or (iii) the set of users with which that communication is initiated.

In some implementations, the workflow module is editable by a user to insert or remove, in the set of operations, an element configured to cause the one or more computers to initiate communication with a user based on data generated by the workflow module.

In some implementations, the set of operations is a sequence of multiple operations, the element is a breakpoint element that is insertable into the sequence of operations such that running the workflow module causes the one or more computers to: perform first operations occurring in the sequence of operations before the breakpoint element; and after performing the first operations: initiate communication with a user before performing second operations that occur after the breakpoint element in the sequence of operations; and pausing or cancelling processing of the second operations.

In some implementations, the workflow module includes a rule configured to require approval of a user before proceeding with at least a portion of the set of operations; and the method further includes, based on the rule, pausing execution of the set of operations of the workflow module in response to detecting the occurrence of the particular condition.

In some implementations, the workflow module includes a rule that specifies a predetermined amount of time to wait for approval to be received from a user; where the method further includes: pausing the operations of the workflow for predetermined amount of time; and after the end of the predetermined amount of time, resuming execution of the operations in the set of operations.

In some implementations, initiating the communication includes sending the communication as an alert or notification and continuing performance of the set of operations.

In some implementations, identifying the user includes selecting the user from a set of users.

In some implementations, the workflow module specifies a job role, and identifying the user includes identifying a user having the job role.

In some implementations, the workflow module indicates multiple users and criteria for selecting different users based on one or more different conditions being detected during processing of the workflow module.

In some implementations, identifying the user includes: accessing data from a database system indicating a set of users and their permission levels; and selecting a proper subset of the users that each have at least a minimum permission level. In these implementations, initiating communication includes initiating communication with each of the users in the selected subset.

In some implementations, the workflow module specifies different types or levels of user interaction to be initiated depending on the one or more conditions detected; or where the workflow module specifies different users to communicate with depending on the one or more conditions detected interaction with different users.

In some implementations, detecting the occurrence of the particular condition includes executing an operation specified by the workflow module that causes the one or more computers to obtain information through a third-party application programming interface (API).

In some implementations, the initiating communication with the user via email, text message, chat, social media, a voice response interface, a graphical user interface, an application, a web page, or a web application.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 is a diagram that illustrates example interface displaying a workflow listing.

Like reference numbers and designations in the various drawings indicate like elements.

DETAILED DESCRIPTION

Figure 1A:
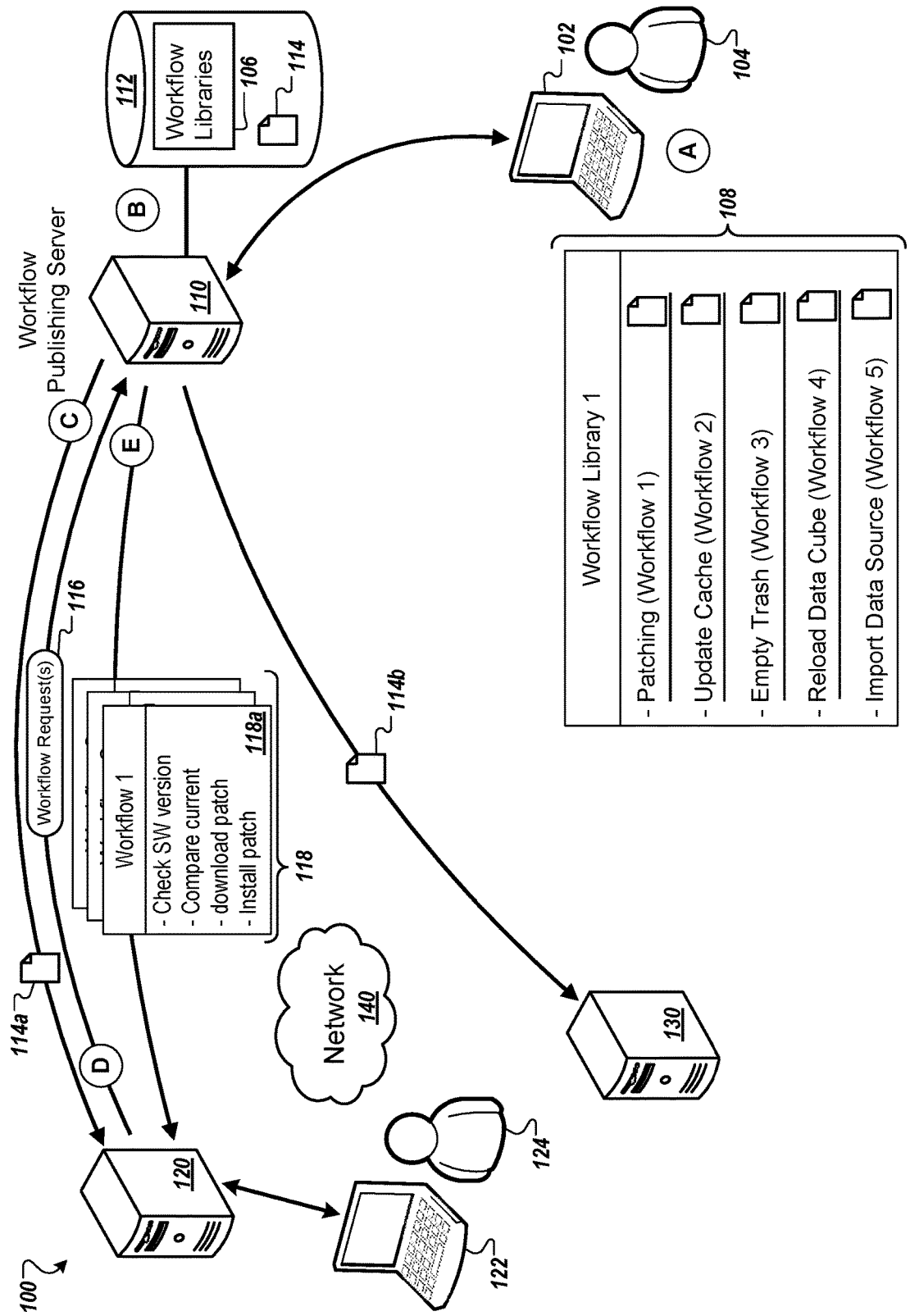
FIGS. 1A-1B are diagrams that illustrate an example system for providing workflows to remote environments.

In some implementations, a set of computing workflows can be defined to facilitate the management or operation of computer systems. A workflow publishing server is configured to distribute computing workflows to third-party servers and users of third-party servers. The workflow publishing server may send a listing of available workflows to other servers. The workflow publishing server may receive requests for one or more workflows indicated in the listing, and, in response, provide the requested workflows. Administrators can select from among the sets of available workflows to enable custom combinations of functionality at the systems they manage.

The workflows can be configured to allow administrators to modify the received workflows. For example, an administrator may modify workflows to better address particular problems or errors experienced by the a server, to customize how the workflows are to be implemented, to select a data source to be used by a workflow, to select a destination to be used by a workflow, to link multiple workflows so the execute together, etc.

In some implementations, the workflow publishing server workflows a remote server based on an analysis of error logs, error reports, and/or server manager logs received from the remote server. In analyzing the error logs, error reports, and/or server manager logs, the workflow publishing server may leverage one or more machine learning to identify conditions present at the remote server and to select relevant workflows.

A workflow can specify a set of computing operations to be performed, potentially along with logic to adaptively or selectively vary which operations are performed and how the operations are performed depending on conditions at a computer system. A workflow can be specified in a workflow module, which can be a data package that indicates the operations, rules, parameters, and other elements or characteristics of the workflow. The workflow module can be a portable and redistributable data package that is arranged to be read and processed so a receiving computer system can implement the process or operations that it specifies. In some implementations, a workflow module can be executable or interpretable (e.g., a data package with executable or interpretable code), but this is not required. Each workflow can be specified a corresponding workflow module that specifies the operations and other elements of the workflow, and allows the workflow to be transmitted from one device or system to another device or system that receives and carries out the operations specified in the workflow module.

For example, a workflow can include instructions for a computer system to perform a sequence of actions or functions. The workflow can specify data to be acquired (e.g., to determine current settings, current performance metrics, etc.) and conditions to be evaluated, which can result in different sets of operations being performed by the computer system. Workflows can have many different uses, such as to install patches, change settings, fix causes of errors, optimize performance, resolve incompatibilities, correct dependencies, refresh caches, optimize data sets, monitor performance, and more. Frequently, a workflow is designed to cause a specific purpose or result when run. An administrator can select workflows to be run periodically to automate maintenance, or workflows may be run on-demand.

A workflow can be packaged in a standard, lightweight form that can be interpreted or executed without being compiled. Part of a workflow can be a collection of commands to be performed, similar to a script or batch file. As discussed further below, a workflow can have various types of logic integrated into the workflow that allow the execution of the commands to be varied according to the context of the computer for which it is run. For example, a workflow may include different mutually exclusive branches representing different sets of commands, and the computer that executes the workflow can determine which branch is appropriate when the workflow is run. As another example, the workflow can include parameters (e.g., fields, variables, etc.) that are adaptively set for the particular computer running the workflow. These parameters for execution of the workflow may be edited and customized by an administrator, or may be set by the operation of the workflow based on data collected by the workflow through interaction with elements of the computer system. The commands that a workflow instructs to be performed can be commands to invoke functions of software already installed on a computer system, such as functions of an operating system, applications, tools, and so on that are already installed on the computer system. A workflow may also initiate other types of actions, such as interacting with another system using an application programming interface (API), changing settings of the computer or connected system, and so on. In some implementations, the workflow itself may include executable code to be run.

The workflow can be packaged as a module that is redistributable, and so does not need an installation process to be used. Additionally, the module can be editable so that users can tailor the operation for their respective needs. In some implementations, the workflow may designate fields that are customizable by a user. For example, the workflow can include fields for time periods to take actions, resources (e.g., files, folders, devices, etc.) that operations of the workflow act on, values for settings, and so on. Further, the workflow can be editable to add, remove, and modify operations of the workflow.

A server system may provide a configuration interface (e.g., through an application on a client device, a web page, a web application, etc.) that allows an administrator to configure the operation of the server system. The management interface can be configured to communicate with a remote management server to request and receive workflow modules, or have workflow modules and workflow lists pushed from the management server. Once a workflow is received, the configuration interface can include features to request, review, edit, activate, and deactivate workflow modules. For example, the configuration interface can enable a user to view the properties of a specific workflow module, view the operations the workflow module is configured to perform, edit those operations and/or resources the operations use or act on, and save any changes to the customized workflow module. The configuration interface can enable the user to initiate running the workflow, for example, by manually initiating execution, by setting the workflow to be run at a scheduled time (e.g., once or on a recurring schedule), or by setting the workflow to be run in response to detecting one or more conditions (e.g., to run a workflow when load exceeds a threshold, or when a particular type of error occurs, or for another condition).

Each workflow may include or otherwise be associated with a set of metadata that specifies the applicability of the workflow to different systems. For example, the metadata may indicate a type of result achieved by the workflow, a set or range of version codes for software that the workflow is compatible with, a type of error or condition that the workflow is configured to address, user permissions or security credentials needed to run the workflow, dependencies needed by the workflow, a set of applications used by the workflow, a set of settings changed by the workflow, and so on. This metadata can enable computer systems to determine the applicability of different workflows to particular systems.

Figure 1B:
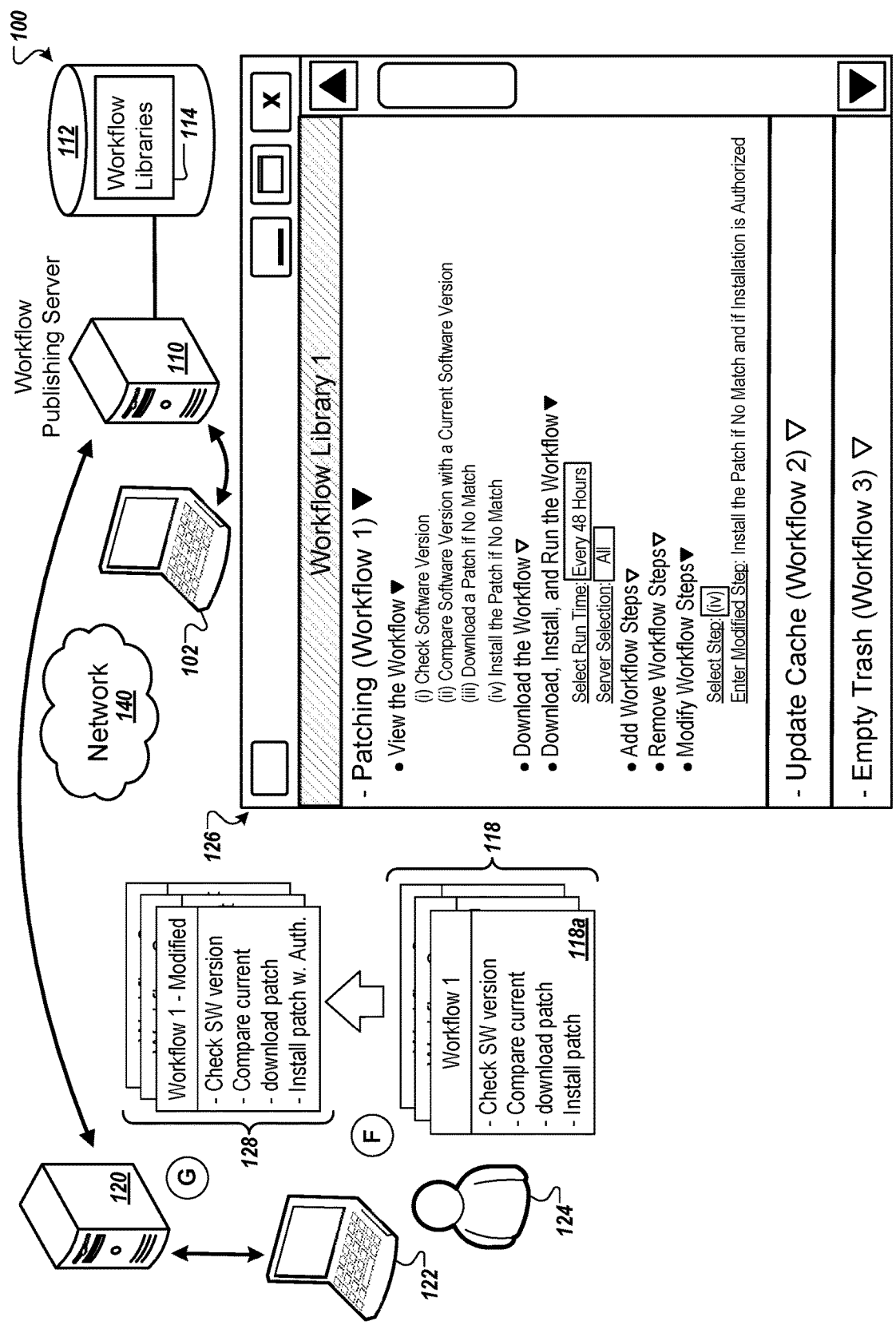

FIGS. 1A-1B are diagrams that illustrate an example system 100 for providing workflows to remote environments, such as third-party servers. The system 100 includes a workflow publishing server 110 and an administrator device 102. The system 100 is able to transmit one or more workflows to servers 120 and 130 over a network 140, so that the servers 120 and 130 can customize and run the received workflows.

The system 100 allows the workflow publishing server 110 to push one or more workflows to the third-party servers 120 and 130. The system 100 also allows one of the third-party servers 120 and 130 to pull one or more workflows from the workflow publishing server 110. The workflow publishing server 110 may provide various different systems with a listing of workflows that are available. When a system receives a workflow from the workflow publishing server 110, the workflow can be customized before it is run. In general, workflows each specify a set of operations to be performed. The workflow can designate the performance of operations to be conditional on the occurrence of particular events or conditions. A workflow may contain mutually exclusive alternatives or branching sets of operations, where one set of operations is performed instead of another set based on the conditions that are satisfied.

FIGS. 1A-1B also illustrate a flow of data, shown as stages (A) to (I), with each representing a step in an example process. Stages (A) to (I) may occur in the illustrated sequence, or in a sequence that is different from the illustrated sequence. For example, some of the stages may occur concurrently.

The administrator device 102 can be a computing device, such as a desktop computer, a laptop computer, a mobile phone, a smart phone, a personal digital assistants (PDA), a tablet computer, or other computing devices. The administrator device 102 can communicate with the workflow publishing server 110 over, for example, the network 140.

The network 140 can include public and/or private networks and can include the Internet.

The workflow publishing server 110 has associated data storage 112 storing one or more workflow libraries 106. The workflow publishing server 110 may include one or more computing devices. The workflow publishing server 110 communicates with servers 120 and 130 over the network 140. In some implementations, one or more computers of the workflow publishing server 110 may communicate with the administrator device 102 and one or more other computers may perform other tasks, such as communicating with the servers 120 and 130. The workflow publishing server 110 may communicate with the servers 120 and 130 through one or more application programming interfaces (APIs).

The servers 120 and 130 may each include one or more computing devices. The servers 120 and 130 are remote with respect to the workflow publishing server 110. The servers 120 and 130 may each be part of a cloud computing platform (e.g., Amazon Web Services (AWS), Microsoft Azure, and so on).

In the example of FIGS. 1A-1B, the workflow publishing server 110 provides workflows for the management of a computing platform that includes software run by the servers 120 and 130. For example, the platform may be a data analytics software platform that includes one or more applications or services, e.g., web server functionality, functionality to access data repositories, query response functionality, functionality to generate visualizations, and so on. The servers 120 and 130 may each run the software of the platform in independently managed systems, for example, for different companies and organizations. As a result, the servers 120 and 130 represent systems that are managed and operated independently from each other and from the workflow publishing system 110. The workflow publishing server 110 can make the workflows available so that the administrators of third-party systems, e.g., servers 120 and 130, can separately select and run the workflows to enhance the maintenance and operation of the software platform. In some implementations, the workflow publishing server 110 is operated by or is affiliated with the provider of the software platform. The workflows may be created, tested, and/or validated before being made available to other systems by the workflow publishing server 110. For example, the workflows can be trusted or certified sets of operations for maintaining or optimizing the software platform.

The techniques disclosed in this document can increase the efficiency and accuracy of server system management. One or more workflows can be accessed, implemented, and processed in order to automate many tasks that would otherwise require significant manual input. In addition, by reducing the amount of manual input needed, server system management using the disclosed techniques is less prone to errors and/or reaction inconsistencies. The disclosed techniques further improve the efficiency and accuracy of server system management by, in some implementations, recommending specific workflows for a particular system based on of their server system and/or their determined needs. The recommended workflows may be determined based on an analysis of one or more error reports or error logs for a system. The recommended workflows may be determined based on analysis of previous actions taken, such as a log of actions that an administrator took to maintain or adjust a server. The recommended workflows may be selected by leveraging one or more machine learning. The disclosed techniques further improve the efficiency and accuracy of server system management by allowing the customization of workflows to the specific needs of a particular administrator or system.

The techniques disclosed in this document can increase the reliability of server systems. Workflow operations may be created and/or customized such that they are performed automatically when certain conditions are satisfied. These operations may include, for example, updating software, installing patches, importing new data, or removing old data that can increase and maintain the reliability of server systems. Conditions which may trigger the performance of these operations may include, for example, a determination that a software update or patch has come available, if a certain amount of time has passed since the operation was last performed, or a determination that new data has come available. Accordingly, server system reliability is improved by ensuring, for example, that the server system is using the latest software, has the latest patches installed, is using the newest available data, etc. In some implementations, the disclosed system is able to recommend one or more workflows to be implemented in a particular server system. The disclosed system may recommend workflows when it determines that the workflow may increase the reliability of the server system or increase the efficiency of the server system, e.g., through an analysis of the server system's error reports or server manager logs.

As shown in FIG. 1A, in stage (A), a workflow library 106 is created or updated. This can involve creating, modifying, testing, and/or validating workflows to be included in the workflow library 106. 106 As shown, a first workflow library 106 includes five workflows: a first workflow for patching software ("Workflow 1"), a second workflow for updating a cache of a computer system ("Workflow 2"), a third workflow for emptying a trash folder of a file system ("Workflow 3"), a fourth workflow for reloading an online analytical processing (OLAP) data cube ("Workflow 4"), and a fifth workflow for importing a data source ("Workflow 5"). The administrator 104 may upload the new or modified workflow library 106 to the workflow publishing server 110 over the network 140 or over a different network Validating or testing a workflow of a workflow library may involve performing one or more of the operations within a workflow (or all operations within a workflow) on a testing environment. The testing environment may be a computer, a computing system, a server environment, a virtual machine, etc. During validation, the operation of the workflow can be tested to ensure proper results are achieved, that security is maintained, compatibility is achieved with an appropriate set of software versions or system configurations, etc.

The workflows in the workflow library 106 can be created on the device 102 or any of various other devices and uploaded to the workflow publishing server 110 for storage and distribution.

In stage (B), the workflow publishing server 110 adds the new or modified workflows to the library 106, which is stored in the data storage 112. This may involve replacing a previous version of the workflow library 106 or updating a previous version of the workflow library 106.

When the workflow publishing server 110 adds the new or modified workflow library 106 to the workflow libraries 106, it may also generate or update a workflow listing 114. The workflow listing 114 may list all workflows included in the workflow libraries 106. The workflow listing 114 may list all workflows from a particular workflow library. For example, there may be separate workflow listings for each workflow library.

The workflow listing 114 may include information about each of the workflows within the workflow listing 114 as is discussed in more detail below with respect to FIG. 2. This information may include metadata, such as a name of the workflow, a purpose of the workflow or an error that the workflow addresses, a description of the operations within the workflow (e.g., which may also include required conditions for the workflow to be performed), a list of persons who can initiate running of the workflow, security permissions for the workflow, and software versions that the workflow is compatible with.

In stage (B), the server 502 runs the workflow 506 (512). The server 502 may run the workflow 506 upon retrieving it from the data storage 504. The server 502 may wait to run the workflow 506 until it receives approval or confirmation from a user. The user may need to belong to a particular group, e.g. the administrator group, or may need to have a particular or high enough security or permission level in order to approve or confirm the running of the workflow 506.

The workflow listings 114a and 114b may be sent by the workflow publishing server 110 to the servers 120 and 130 respectively over the network 140. Here, the workflow publishing server 110 pushes the workflow listings 114a to the server 120, and the workflow listing 114b to the server 130. The workflow publishing server 110 may push the workflow listings 114a and 114b if they have been recently updated (e.g., new workflows have been added, a workflow library which corresponds with the workflow listing has been updated or added, etc.). The workflow publishing server 110 may push these workflow listings 114a and 114b periodically. For example, the workflow publishing server 110 may have scheduled to send the server 120 a workflow listing every two days. The schedule for the server 130 may be different than the schedule of the server 120. For example, the workflow publishing server 110 may have scheduled to send the server 130 a workflow listing every week as opposed to every two days for the server 120.

In some implementations, a server, such as the server 120 or 130, requests a workflow listing from the workflow publishing server 110. The third-party server may schedule workflow listing requests so that they are sent periodically.

In some implementations, different workflow listings 114a and 114b are provided to the servers 120 and 130. For example, the servers 120 and 130 may run different versions of software or have different configurations, so that different sets of workflows are applicable to each. The workflow publishing server 112 can select a customized subset of the workflows in the workflow library 106 for each server, based on known characteristics of the servers. For example, the servers 120 and 130 can periodically provide configuration data indicating software installed, versions of the software, configuration settings, load levels, usage logs, error logs, and so on. From this information, the workflow publishing server can filter the workflow listing 114 so that each workflow listing 114a, 114b has a customized, filtered subset of the workflows.

In some implementations, the workflow listings 114a and 114b are listings of recommended workflows that the workflow publishing server 110 selects as being recommended for the servers 120 and 130. In these implementations, the workflow publishing server 110 may receive (e.g., periodically) error reports or error logs experienced by the server 120 and/or the server 130, and server manager logs from the server 120 and/or 130. The workflow publishing server 110 may analyze these error reports, error logs, and/or server manager logs, and recommend one or more workflows to the respective third-party server.

An analysis of these error reports, error logs, and/or server manager logs may be used to identify workflows that solve specific problems experienced by the respective third-party server and/or workflows that solve similar problems experienced by the respective third-party server. For example, an analysis of an error report of the server 120 may reveal that a number of errors are occurring because the software is out of date. In this example, the workflow publishing server 110 may search through the metadata of the workflows in the workflow libraries 106 to identify any workflows that are related to updating server software or patching server software, and provide the identified workflows to the server 120. A recommended workflow does not need to solve the exact same problem to be recommended because, as will be discussed in more detail below with respect to FIG. 1B, the workflow can be customized for the particular server that it is to be implemented in.

An analysis of these error reports, error logs, and/or server manager logs may reveal workflows that can increase system stability (e.g., if it is determined that one or more errors are due to a high server load, or a high degree of fluctuation in server load, etc.). An analysis of these error reports, error logs, and/or server manager logs may reveal workflows that can reduce user input (e.g., if it is determined that server managers or users are repeatedly doing tasks that could be automated by a workflow, if it is determined that the one or more errors are due to human input error, or if it is determined that the one or more errors are due to inconsistent human oversight). The workflow publishing server 110 may filter out workflows from the recommended workflows if they are incompatible with the respective third-party server, e.g., the workflow requires a different software version than what is installed on the server. The workflow publishing server 110 may provide these recommended workflows to the respective third-party servers as part or all of the workflow listings 114a and 114b.

In some implementations, the administrator 104 may select the one or more workflows to recommend to the servers 120 and 130 based on the results of analysis performed by the workflow publishing server 110 on the respective error reports, error logs, critical log files (e.g., logs for an application server, logs for an intelligence server, logs for queue producers, logs for queue consumers, etc.), core files, crash dumps, and/or server manager logs.

In some implementations, the workflow publishing server 110 leverages one or more machine learning in order to analyze the respective error reports, error logs, critical log files (e.g., logs for an application server, logs for an intelligence server, logs for queue producers, logs for queue consumers, etc.), core files, crash dumps, and/or server manager logs associated with, for example, the servers 120 and 130. In these implementations, the workflow publishing server 110 may capture other attributes and/or characteristics of the servers 120 and 130 such as the operating system (OS) used, the version of the OS used, applications or services run, versions of applications or services run, hardware characteristics, etc. These attributes and/or characteristics may be made available to and used by the one or more machine learning. In these implementations, the workflow publishing server 110 may feed the error reports, error logs, critical log files, core files, crash dumps, server manager logs monitor, attributes, and/or characteristics associated with, for example, the servers 120 and 130 to the one or more machine learning to see if the server conditions matched known defects. Using this information, the one or more machine learning may determine one or more server conditions. The one or more machine learning may represent the one or more server conditions as a pattern.

The output of the one or more machine learning may be used by the workflow publishing server 110 or the administrator 104 to select one or more workflows for recommendation. For example, if the observed server conditions/pattern matched a previously known defect, the one or more machine learning may recommend a known workflow associated with those conditions. If the observed server conditions/pattern did not match a known defect, then an analysis would be done for these new conditions/new pattern, and a new workflow may be generated to address these new conditions/new pattern. The analysis may be performed by a user of the workflow publishing server 110. The new workflow may be generated by a user of the workflow publishing server 110. The analysis may be performed automatically by the workflow publishing server 110 through, for example, trial and error and/or leveraging one or more machine learning to determine which workflows are likely work based on, for example, what workflows are associated with conditions similar to the observed conditions, what workflows have a high rate of success, etc. For example, the workflow publishing server 110 may attempt to use existing workflows to see if any have a beneficial effect on the server conditions. The workflow publishing server 110 may test the existing workflows in the order of which are determined to have the highest likelihood of success based on, for example, leveraging the one or more machine learning. If one or more workflows are determined to have a beneficial effect on the observed server conditions (e.g., less defects, less severe defects, better performance, etc.), the workflow publishing server 110 may associate those one or more workflows with the observed conditions/pattern, e.g. associate those one or more workflows with the specific defect detected.

The one or more machine learning may include one or more machine learning models. The one or more machine learning models may include an unsupervised learning model.

The workflow listing 114a may be the same or different from the workflow listing 114. The workflow listing 114 may be modified for the server 120 in order to generate the workflow listing 114a. For example, the workflow listing 114a may contain the workflows found in the workflow listing 114 that are compatible with the software of server 120. Similarly, the workflow listing 114b may be the same or different from the workflow listing 114. The workflow listing 114 may be modified for the server 130 in order to generate the workflow listing 114b. For example, the workflow listing 114b may contain the workflows found in the workflow listing 114 that are compatible with the software of server 130.

In stage (D), after having received the workflow listing 114a, a user 124 of the client device 122 may select one or more workflows from the workflow listing 114a for download from the workflow publishing server 110. In selecting one or more workflows from the workflow listing 114a, one or more workflow requests 116 are generated by the server 120 and sent to the workflow publishing server 110. The one or more workflow requests 116 may contain a name or other indication of the one or more selected workflows, and/or a name or other indication of the source of the one or more workflows, such as a name or other indication of the one or more workflow libraries that correspond with the one or more selected workflows.

The one or more workflow requests 116 may contain additional information, such as information about the server 120. This additional information may contain, for example, the software version(s) used by the third-party server, error logs or reports related to the third-party server, server manager logs, storage capacity of the third-party server, remaining storage space of the third-party server, performance information related to all or part of the third-party server (e.g., bandwidth, load experienced, amount of memory, number of processors, type of processors, etc.), The one or more workflow requests 116 may be sent to the workflow publishing server 110 over the network 140.

In some implementations, the one or more workflow requests 116 do not specifically name or identify one or more workflows. In these implementations, the workflow requests 116 may contain a query for workflows for the workflow publishing server 110. The query may include information naming or describing a specific error, condition, or other issue experienced by the server 120. The workflow publishing server 110 may access the workflow libraries 106 through the data storage 112, and compare the query information to the metadata for each of the workflows. In comparing the query information to the workflow metadata, the workflow publishing server 110 may identify one or more workflows that specifically address the error, condition, or other issue experienced by the server 120, and/or one or more workflows that are related to the error, condition, or other issue experienced by the server 120. The workflow publishing server 110 may leverage one or more machine learning in identifying the one or more workflows.

In stage (E), in response to receiving the one or more workflow requests 116, the workflow publishing server 110 sends the requested workflows 118 (or a subset of the requested workflows) to the server 120. The workflow publishing server 110 may first analyze the received one or more workflow requests 116 to determine which workflows are being requested. The workflow publishing server 110 may access the data storage 112 to obtain the requested workflows 118 in preparation of sending the requested workflows 118 to the server 120. Here, the user 124 had requested three workflows: including Workflow 1, Workflow 2, and Workflow 3. These three workflows make up the requested workflows 118 and are sent to the server 120. In addition to sending the workflows, the workflow publishing server 110 may provide instructions for installing and running each of the workflows in the requested workflows 118.

In the example, a workflow module 118a is shown as an example of a data package that defines a particular workflow, e.g., Workflow 1 for patching. The workflow module 118a may be a data package or one or more files (e.g., script files) that provides instructions for a set of operations to be performed. For example, the workflow module 118a may include instructions for the client device 122 (and/or the server 120) to perform a set of operations related to patching. Specifically, the workflow module 118a may include, for example, instructions for the client device 122 to (i) check the software version (e.g., current software version and/or required software version), (ii) compare the current software version with the required software version, (iii) download a patch for the required software version, and (iv) install the patch for the required software version. The workflow module 118a can be arranged and formatted so that the client device 112 or another device receiving the workflow module 118a can automatically perform some or all of the operations of the specified workflow upon receiving and processing the workflow module 118a.

The workflow module 118a may optionally be executable. That is, the workflow module 118 may include an executable file (e.g., compiled software code) that can be executed by the client device 122 (and/or the server 120). Alternatively, the workflow module 118a may be a data package containing multiple executable files that can be executed by the client device 122 (and/or the server 120). This is only one of many options for specifying a workflow, many of which do not involve or require executable code. In fact, for cross-platform support, it may be advantageous in many implementations to specify instructions in a form that is not compiled for a specific operating system or architecture, but nevertheless indicates operations to perform.

Similarly, the workflow module 118a may be interpretable. That is, the workflow module 118a may include instructions that are not compiled but nevertheless can be performed by the client device 122 (and/or the server 120) after receiving the workflow module 118a.

In some implementations, the workflow publishing server 110 removes one or more workflows from the requested workflows 118 due to a determination that one or more workflows are incompatible with the server 120. This subset of the requested workflows 118 may be sent to the server 120 in place of the requested workflows 118. In these implementations, a notification may be provided to the server 120 indicating that one or more workflows were not sent due to incompatibility.

In some implementations, the workflow publishing server 110 pushes one or more workflows to the server 120 or the server 130 without the need for any workflow requests, such as the one or more workflow requests 116. In these implementations, the workflow publishing server 110 may push recommended workflows in response to analysis of a third-party server's error reports, error logs, and/or server manager logs. The workflow publishing server 110 or the administrator 104 may identify which workflows to recommend in accordance with the methods described above with respect to stage (C).

As shown in FIG. 1B, in stage (F), the user 124, through an interface 126 of the client device 122, inspects the requested workflows 118 and generates a set of modified workflows 128 from the requested workflows 118. Here, the user 124 has selected Workflow 1 in the interface 126, allowing the user 124 to inspect Workflow 1 and modify it. The user 124 has selected the option to "View the Workflow," revealing the operations contained within Workflow 1. These operations include a first operation to check the software version of the server, a second operation to compare the software version with a current software version, a third operation to download a software patch if the checked software version does not match the current software patch, and a fourth operation to install the software patch if the checked software version does not match the current software patch. Other options that the user 124 has not selected include an option to download the workflow, an option to add workflow steps (e.g., add additional operations to Workflow 1 that may or may not be conditional, or add alternative operations to the workflow), and an option to remove workflow steps (e.g., remove an operation from Workflow 1).

An option that the user 124 has selected is an option to download, install, and run the workflow. By selecting this option, the user 124 is presented a field to select or enter a run time, and a field to select or enter the specific servers or server environments that Workflow 1 should be installed on or otherwise implemented in. In the run time field, the user 124 has selected to run Workflow 1 every 48 hours. The user 124 may have been able to select or enter other options, such as every 12 hours, every 24 hours, every week, every month, every year, once—immediately, once—with a delay (e.g., a delay of 1 hour, 2 hours, 12 hours, 1 day, 1 week, etc.), etc. In the server or server environment field, the user 124 has selected or entered "all." Accordingly, the user 124 has chosen for Workflow 1 to be installed and run on all of server 120's servers and/or server environments, or on all of server 120's compatible servers and/or server environments.

An option the user 124 has selected is an option to modify workflow steps. By selecting this option, the user 124 is presented a field to select or enter a step, e.g., an operation, to modify and a field to enter the modification(s). Here, the user 124 has selected or entered the fourth operation, the operation to install the software patch if the checked software version does not match the current software patch. The user 124 has modified the fourth operation so that it now includes an additional condition that the installation of the patch must also be authorized by a server manager or admin.

The user 124 may be able to modify the workflows in other ways. For example, the user 124 may be able to select from a list of recommended or frequently used operations. This list may be presented to the user 124 on the interface 126. When the user selects an operation from the list, the operation may replace a currently selected operation or may be added to the operations of the corresponding workflow. The user 124 may be able to drag one or more operations from the list into the workflow. The user 124 may be able to rearrange operations in the workflow by, for example, dragging them into different positions. The user 124 may be able to modify a workflow by entering code that is then added to the computer code corresponding with the workflow, e.g., in order to add one or more new operations to the workflow, add one or more conditions to the workflow or to individual operations in the workflow, etc. The user 124 may be able to modify a workflow by modifying the computer code corresponding with the workflow, e.g., in order to modify existing operations or conditions, remove existing operations or conditions, etc.

The operations of the workflow may be conditional on one or more events being satisfied. These conditions may be temporal conditions, e.g., a date, an elapse of a certain amount of time, etc. These conditions may be satisfied through a triggering event, e.g., the occurrence of an error or a particular error, an instruction or action by a server manager or administrator, a state of the server system, a server load threshold being met, etc. These conditions may be satisfied through the successful performance of one or more higher order operations in the set of operations, e.g., operations that are to be performed before the operation at issue. These conditions may be predetermined. These conditions may be set by the user 124 through the interface 126.

Similarly, the workflow itself may be conditional on one more events being satisfied before it is processed. These conditions may be temporal conditions, e.g., a date, an elapse of a certain amount of time, etc. These conditions may be satisfied through a triggering event, e.g., the occurrence of an error or a particular error, an instruction or action by a server manager or administrator, a state of the server, a server load threshold being met, etc. These conditions may be satisfied through the successful performance of an operation of another workflow or of the successful processing of another workflow. These conditions may be predetermined. These conditions may be set by the user 124 through the interface 126. These conditions may include the occurrence of an event, the nonoccurrence of an event, particular data being identified, particular data not being identified, particular data being matched, particular data not being matched, the time of day, the day of the week, the time of year, a status of a server, the load on a server reaching a threshold level, the security permissions of a user, etc.

The workflows may each contain branching or alternative operations. For example, Workflow 1 may contain a set of alternative operations where a match is found between the checked software version and the current software version. In this example, Workflow 1's alternative operations may include an operation to schedule a check for updates one week from now, an operation to generate a notification indicating that the server is currently running the most up-to-date software, and an operation to generate a notification indicating the scheduled software check if the software check is successfully scheduled. As demonstrated in the example, the branch or path of operations that is performed during the processing of a workflow, such as during the processing of Workflow 1, may depend on the particular conditions satisfied and/or on the successful performance of a higher order operation.

By modifying (e.g., customizing) the requested workflows 118 for the server 120, or for particular servers or server environments within or part of the server 120, the user 124 generates the set of modified workflows 128. In some implementations, the modified workflows 128 are generated in response to the user saving or submitting their modifications to the requested workflows 118.

The user 124 may be able to modify the requested workflows 118 in other ways. For example, the user 124 may be able to select a source to be used by a particular workflow, such as a data source. For example, the user 124 may be able to select a destination to be used by a particular workflow. For example, the user 124 may be able to string multiple workflows together. For example the user 124 may be able to select a script to be used by or with a particular workflow.

At stage (G), the user 124 implements the modified workflows 128 into the server 120. Implementing the modified workflows 128 in the server 120 may involve installing the modified workflows on the server 120, on one or more particular servers part of the server 120, or one or more particular server environments within or part of the server 120. Implementing the modified workflows 128 in the server 120 may involve running (e.g., processing) the modified workflows 128, scheduling one or more times to run each of the modified workflows 128, or setting one or more other conditions (e.g., triggering events) for each of the modified workflows 128 that when satisfied result in running the modified workflows 128. Implementing the modified workflows 128 in the server 120 may involve stringing a workflow from the modified workflows 128 to another workflow, such that the processing of one of the strung workflows is a precondition to the processing of the other strung workflow.

FIG. 2 is a diagram that illustrates example interface 202 displaying the workflow listing 114a as previously shown in FIG. 1a in more detail. As previously mentioned, the workflow listing 114a may contain metadata for each of the workflows within the listing. The metadata may include a name of the workflow, a purpose of the workflow or an error that the workflow addresses, a description of the operations within the workflow (e.g., which may also include required conditions for operation performance), a list of persons who can access the workflow, security permissions for the workflow, and software versions that the workflow is compatible with.

As shown, the workflow listing 114a includes a first row 204 for Workflow 1, a second row 206 for Workflow 2, and a final row 208 for Workflow 5. The workflow listing 114a also includes a column 210 for the names of each of the workflows, a column 212 for the purpose or error to be addressed by each of the workflows, a column 214 for the descriptions and/or required conditions of each of the workflows, a column 216 for the security permissions required for each of the workflows, and a column 218 for the compatible software versions for each of the workflows.

As shown, different workflows may require different security permissions. For example, as shown in column 216 of row 204, Workflow 1 requires a higher security permission of "Full Control" or "Modify" in order to install and/or process Workflow 1, whereas, as shown in column 216 or row 208, Workflow 5 allows many more security permissions to install and/or process Workflow 5. The reason why Workflow 1 may require higher security permissions than Workflow 5 may be due to the operations within each of the workflows. The operations of Workflow 1, as can be seen in column 214 of row 204, involve downloading and installing software which may be viewed as high risk operations (or high risk when compared with the operations of Workflow 5). The operations of Workflow 5, as can be seen in column 214 of row 208, involve identifying and importing data, which may be viewed as low or medium risk operations (or low or medium risk when compared with the operations of Workflow 1).

Figure 3:
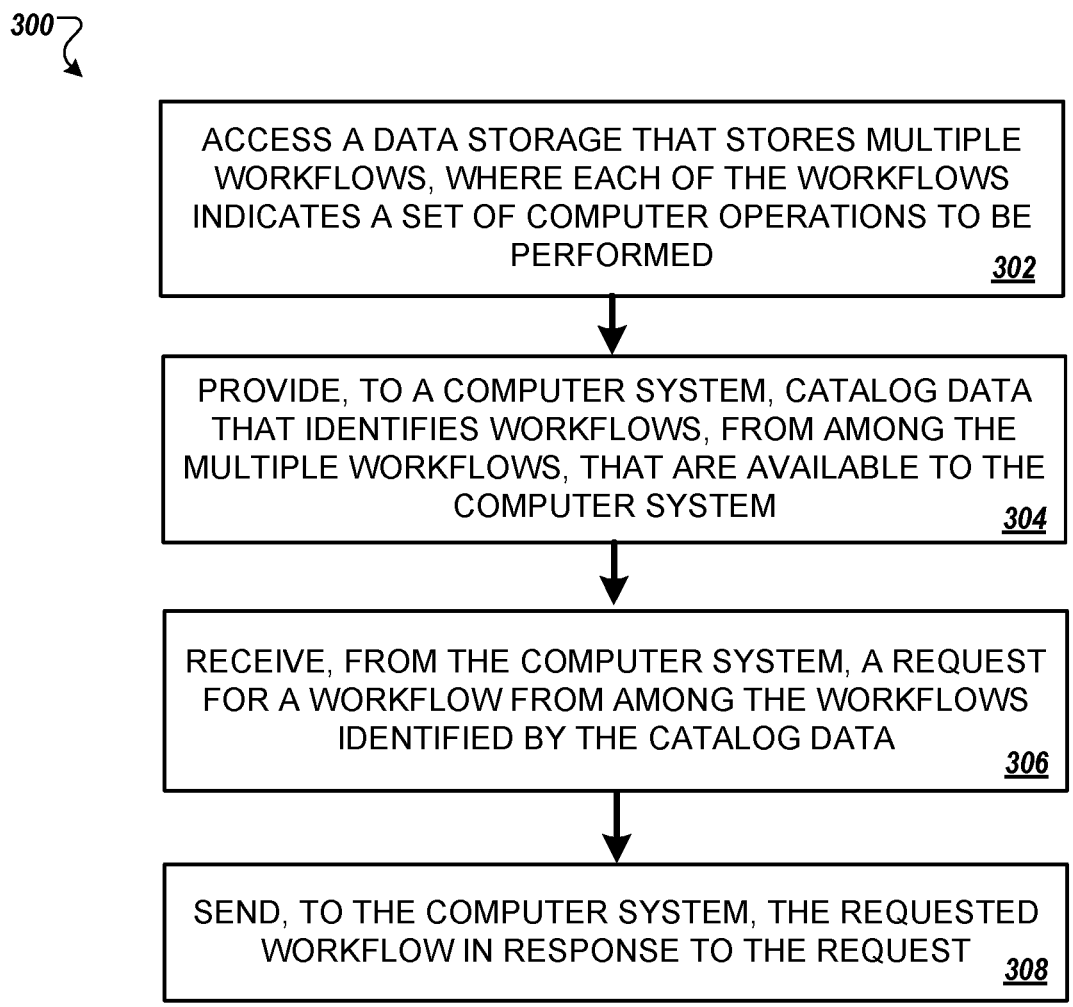
FIG. 3 is an example process for providing workflows to remote environments.

FIG. 3 is an example process 300 for transmitting workflows to remote environments. The process 300 can be performed, at least in part, using the system 100 described herein.

The process 300 includes accessing data storage storing multiple workflows, where each of the workflows indicates a set of computer operations to be performed (302). The computer operations may include downloading software, checking for software updates, updating software, installing software, running software, importing data, exporting data, checking for new or different data, running a script, generating data, generating a notification, sending a notification, etc. The computer operations may be conditional on the satisfaction of one or more requirements. These requirements may include the performance of another operation, the processing of a workflow, a time having elapsed, a triggering event, etc. The data storage may be on-site.

The data storage can store metadata associated with the workflows. The metadata for a particular workflow may include information such as a name of the workflow, a purpose of the workflow or an error that the workflow addresses, a description of the operations within the workflow, a list of persons who can access the workflow, security permissions for the workflow, and/or software versions that the workflow is compatible with.

A workflow can indicate a sequence of multiple operations that are to be performed in a predetermined order. Examples of operations include checking a software version of a server, checking the most recent software version, comparing software versions, downloading software, uploading software, identifying data, uploading data, storing data, downloading data, deleting or clearing data, comparing data, determining destinations, and/or determining sources. As an example, a workflow may include an operation to check the version of software currently used by a particular server, to check the most recent version of the software, and to compare the currently used version with the most recent version. In this example, the operations may need to be performed in a predetermined order. For example, the workflow may need to first check the version of software currently used by the server, then check the most recent version of the software once the first check is performed, and, only after both checks are performed, compare the currently used version with the most recent version. The predetermined order may be set when the one or more workflows are initially created, e.g., by the administrator 104. The predetermined order may modified at a third party server, e.g., by the user 124 of the client device 122 or by a different user of a different client device. The predetermined order may be set at a third party server, e.g., by the user 124 of the client device 122 or by a different user of a different client device.

A workflow may include multiple conditional operations that are designated to be performed when corresponding conditions are satisfied. Examples of conditions include the occurrence of an event, the nonoccurrence of an event, particular data being identified, particular data not being identified, particular data being matched, particular data not being matched, the time of day, the day of the week, the time of year, a status of a server, the load on a server, the security permissions of a user, etc.

In some cases, a workflow includes a chain of conditional operations. The chain of conditional operations may include a first operation and a first condition and a second operation and a second condition. Performance of the first operation may be dependent on the first condition being satisfied, and performance of the second operation may be dependent on the second condition and the first condition being satisfied. As an example, when either the first condition or the second condition is not satisfied, the server running the workflow may automatically abort the workflow and/or may automatically restart the workflow, e.g. after a predetermined amount of time. Similarly, when both the first condition and the second condition are not satisfied, the server running the workflow may automatically abort the workflow and/or may automatically restart the workflow, e.g. after a predetermined amount of time. As an example, when the first condition is satisfied but the second condition is not satisfied, the server running the workflow may wait a predetermined amount of time before automatically aborting the workflow or automatically restarting the workflow. During this predetermined amount of time, the server and/or the workflow may check to see if the second condition is satisfied.

A workflow may contain an operation to check a software version used by the server, compare the employed software version with the most recent version of the software, download the most recent software version if the employed version does not match the most recent version, and install the most recent software version if the employed version does not match the most recent version and if the most recent version downloaded successfully. In this example, the first condition may be whether the employed version of the software matches the most recent version of the software. In this example, the second condition may be whether the most recent software version downloaded successfully. A chain of conditional operations may also include additional operations and conditions.

In some cases, one or more workflows specify multiple alternative sequences of operations to be performed based on conditions present when the one or more workflows are processed. The multiple alternative sequences may be mutually exclusive. The computer or server that executes the workflow can determine which sequence of operations is appropriate when the workflow is run. The conditions for determining a sequence of operations to follow may be the same as the conditions for conditional operations. For example, these conditions may include the occurrence of an event, the nonoccurrence of an event, particular data being identified, particular data not being identified, particular data being matched, particular data not being matched, the time of day, the day of the week, the time of year, a status of a server, the load on a server reaching a threshold level, the security permissions of a user, etc. As an example, a workflow may have two alternative sequences of operations, a first sequence to be performed on weekdays and a second sequence to be performed on weekends. When the computer or server runs the workflow, the computer or server may make a determination as to whether it is a weekday or a weekend. If the computer or server determines that it is a weekday, the computer or server will provide for the first sequence of operations in the workflow to be run. Alternatively, if the computer or server determines that it is a weekend, the computer or server will provide for the second sequence of operations in the workflow to be run.

In some cases, one or more workflows specify operations that involve executing one or more scripts or executables. As an example, executables may include programs and certain files, e.g., files that are .BAT, .COM, .EXE, .BIN, .DMG, and/or .APP files. As an example, a script may include a series of commands within a file that is capable of being executed without being compiled. The scripts may include Python scripts, PHP scripts, JavaScript scripts, etc.

In some cases, one or more workflows specify operations that include shutting down or restarting a server environment. The operations may include a restart operation. The operations may include a shutdown operation. As an example, the operations for shutting down or restarting a server environment may be for shutting down or restarting one or more particular computers of the server environment.

In some cases, one or more workflows specify operations that involve accessing data from a data repository or data indicating operational characteristics of a data repository. As an example, a data repository may include a server, e.g. an on-premises server or a third-party server, or part of a server. As an example, a data repository may include a database. As an example, a data repository may include cloud storage that is provided by a cloud-computing platform. As an example, operational characteristics of the data repository may include log data for accesses to the data repository, a status of the data repository (e.g., an indication of whether or not it is experiencing an error or has recently experienced an error), a number of requests for data within the data repository, performance characteristics (e.g., an average time to process requests for data within with data repository, a maximum time, etc.), an indication of the specific data requested from the data repository, an indication of data added to the data repository, one or more dates and times associated with a request for data, one or more dates and times associated with data added to the data repository, etc.

In some cases, one or more workflows represent a template of operations to be customized for a particular server environment. For example, a workflow may include one or more fields that can be filed, customized, or modified. In this example, the one or more fields may be empty and may need to be filled in, e.g., by the user 124 using the user device 122. In this example, the one or more fields may have default values that are automatically set, e.g., by the workflow publishing server 110, or by are set by a user, e.g., the administrator 104 through the administrator device 102. As another example, one or more fields may be added to the workflow to, for example, add additional operations, further define operations, add conditions to operations, etc. The fields may correspond with an operation, with a condition for a conditional operation, with a condition for a particular sequence of operations, with multiple operations, etc. The fields may allow a user to, for example, specify a run time for the workflow, specify one or more server environment on which to run the workflow, add one or more operations, modify one or more existing operations, remove one or more existing operations, rearrange an order of the operations, set an order of the operations, set a hierarchy of the operations, divide the operations into multiple sequences of operations, assign one or more operations to a specific sequence of operations, remove one or more operations from a sequence of operations, etc.

In some cases, one or more workflows address specific errors or conditions of server environments, and have metadata indicating the errors or conditions they address. As an example, the specific errors or conditions may include the cache allocated to a server environment being full or approaching capacity (e.g., 70% full, 80% full, 90% full, etc.), poor performance of the server environment (e.g., unacceptable load times, render times, reporting times, etc.), a server environment crash, the amount of load on the server environment, hardware failure, etc. As an example, the metadata indicating the errors or conditions may include a purpose of the one or more workflows, an error that the one or more workflows address, a description of the operations within the one or more workflows. In addition, metadata such as security permissions may also provide some indication of the errors or conditions that the one or more workflows address.

The process 300 includes providing, to a computer system, catalog data identifying workflows, from among the multiple workflows, that are available to the computer system (304). The catalog data may include or be a workflow listing, e.g. workflow listings 114a or 114b as shown in FIG. 1. The catalog data may identify a set of workflows. The catalog data may contain one or more workflow libraries, e.g. workflow library 106 as shown in FIG. 1). The catalog data may be a workflow library. The catalog data may contain metadata that corresponds to one or more workflows. The metadata may include a name of the one or more workflows, a purpose of the one or more workflows or an error that the one or more workflows address, a description of the operations within the one or more workflows (e.g., which may also include required conditions for operation performance), a list of persons who can access the one or more workflows, security permissions for the one or more workflows, and software versions that the one or more workflows are compatible with. In some implementations, the identified workflows are those workflows that are compatible with the computer system. The computer system may be a server, a group of servers, a server system, or a server environment (e.g., the server 120 as shown in FIGS. 1A-1B). The computer system may be part of a cloud-computing service or environment.

In some cases, providing the catalog data includes publishing the catalog data to multiple systems. As an example, the multiple systems may include one or more server systems, server environments, computer systems, etc. For example, the multiple systems may include the server 120 and the server 130 shown in FIG. 1. As an example, the catalog data may be published over a public or private network such as the Internet.

In some cases, providing the catalog data includes pushing the catalog data to one or more systems. For example, the catalog data may be pushed by the workflow publishing server 110 shown in FIG. 1. As an example, the one or more systems may include one or more server systems, server environments, computer systems, etc. In this example, the one or more computer systems may include or be part of one or more server systems or server environments. For example, the one or more systems may include the server 120 and/or the server 130 shown in FIG. 1.

In some cases, the catalog data includes metadata associated with each of the workflows. The metadata may indicate software the associated workflow applies to, conditions the associated workflow applies to, permissions needed for the associated workflow, a description for the associated workflow, and/or an error addressed by the associated workflow. As an example, conditions that a workflow applies to or errors addressed by the workflow may include conditions or errors experienced by a server system or environment running the workflow. In this example, the conditions may include the cache allocated to a server environment being full or approaching capacity (e.g., 70% full, 80% full, 90% full, etc.), poor performance of the server system or environment (e.g., unacceptable load times, render times, reporting times, etc.), a server system or environment crash, the amount of load on the server system or environment, hardware failure, etc. As an example, the permissions needed for the associated workflow may include security permissions. In this example, security permissions may include a full control permission, a modify permission, a read and execute permission, a write permission, etc. As an example, a user of the server system or server environment may be assigned one or more permissions, e.g. by an administrator of the server system or server environment.

The metadata of the workflows may be used by the computer system in performing actions or in preventing actions from being performed. For example, the metadata associated with a workflow may be used by the computer system to prevent some users from running the workflow on the computer system if they do not have the requisite permission level as indicated by the metadata. As another example, the metadata indicating a software associated with a workflow may be used by the computer system to prevent the workflow from being run if the workflow is no longer compatible with the computer system, e.g. where the software on the computer system has been updated or upgraded since the workflow was downloaded from the workflow publishing server 110 shown in FIG. 1. Similarly, a user of the computer system may use the metadata indicating the software to ensure that the workflow is compatible. A user of the computer system may adjust or modify the metadata of a workflow. For example, a user may change the conditions, permissions, description, and/or error addressed of a particular workflow.

The process 300 includes receiving, from the computer system, a request for a workflow from among the workflows identified by the catalog data (306). The request may specifically name or otherwise identify one or more workflows from the workflows identified by the catalog data. In some implementations, the request does not specifically name or specifically identify one or more workflows. In these implementations, the request may contain a query. The query may include information naming or describing a specific error, condition, or other issue experienced by the computer system. The query information may be compared to metadata corresponding to the multiple workflows. In comparing the query information to the workflow metadata, the system (e.g., the system 100 as shown in FIGS. 1A-1B) or a part of the system (e.g., the workflow publishing server 110 as shown in FIGS. 1A-1B) may identify one or more workflows of the multiple workflows that specifically address the error, condition, or other issue experienced by the computer system, and/or one or more workflows that are related to the error, condition, or other issue experienced by the computer system. The system (e.g., the system 100 as shown in FIGS. 1A-1B) or a part of the system (e.g., the workflow publishing server 110 as shown in FIGS. 1A-1B) may leverage one or more machine learning in identifying the one or more workflows of the multiple workflows.

The process 300 includes sending, to the computer system, the requested workflow in response to the request (step 308). The requested workflow may be sent to the computer system over a network. The system (e.g., the system 100 as shown in FIGS. 1A-1B) or a part of the system (e.g., the workflow publishing server 110 as shown in FIGS. 1A-1B)

may check to confirm that the workflow requested is compatible with the computer system before sending.

The process 300 optionally includes receiving a request for catalog data. In these cases, providing the catalog data includes providing the catalog data in response to receiving the request for catalog data. For example, the catalog data may be provided by the workflow publishing server 110 shown in FIG. 1 to the server 120 in response to a request for the catalog data being sent by the server 120 to the workflow publishing server 110. The request for the catalog data and the catalog data may be sent over a public or private network such as the internet.

The process 300 optionally includes identifying a configuration of the computer system, and providing a customized subset of the workflows based on the configuration of the computer system. As an example, the configuration of the computer system may include one or more characteristics of the computer system. As an example, the configuration of the computer system may indicate software installed on the computer system, versions of the software installed, configuration settings of the computer system, load levels experienced by the computer system, usage logs of the computer system, error logs of the computer system, and so on. As an example, in providing a customized subset of workflows, the workflow publishing server 110 shown in FIG. 1 can filter the workflows to identify those that are compatible with the configuration of the computer system, or are compatible with one or more characteristics of the configuration of the computer system.

In some cases, providing a customized subset of the identified workflows is based on a software version for software used by the computer system, a setting of the computer system, a usage pattern of the computer system, an error encountered by the computer system, and/or a limitation encountered by the computer system. For example, each workflow that is compatible with a first version of a particular software, e.g. version 2.1, may be placed in the subset, e.g. by the workflow publishing server 110 shown in FIG. 1. In this example, the first version of the software may be the version used by the computer system, e.g. a server, requesting the workflows.

As an example, settings may include configuration settings. In this example, all workflows that are compatible with the configuration settings may be placed in the subset. The configuration settings may correspond with the computer system. The configuration settings may include, for example, a cache size of the computer system, memory allocated to the computer system, processors allocated to the computer system, bandwidth of the computer system, software used by computer system, software versions used by the computer system, etc.

As an example, usage patterns may include operation patterns associated with users of the computer system. The usage patterns may be determined by the workflow publishing server 110 shown in FIG. 1 by, for example, leveraging one or more machine learning. The usage patterns may indicate, for example, operations frequently performed by users of the computer system, operations that are frequently performed together, operations that typically follow an earlier operation, operations are typically performed during a particular state of the computer system (e.g., particular date, particular time of the day, particular load level on the computer system or threshold load level being reached, etc.), etc.

As an example, errors encountered by the computer system may include the cache allocated to computer system being full or approaching capacity (e.g., 70% full, 80% full, 90% full, etc.), poor performance of the computer system (e.g., unacceptable load times, render times, reporting times, etc.), the computer system experiencing a crash, the amount of load on the computer system reaching a threshold level, hardware failure, etc. In determining whether the computer system has encountered an error, as an example, the workflow publishing server 110 may analyze error reports, error logs, and/or server manager logs of the computer system in order to identify errors encountered by the computer system. In analyzing error reports, error logs, and/or server manager logs, the workflow publishing server 110 may, for example, leverage one or more machine learning.

The process 300 optionally includes receiving information, from the computer system, indicating a log of actions performed by the computer system, determining a level of similarity of actions in the log with operations in a workflow of the multiple workflows, determining that the level of similarity satisfies a threshold; and providing, to the computer system, the workflow or a recommendation for the workflow based on determining that the level of similarity satisfies the threshold. As an example, the information may include usage logs or server manager logs. As an example, determining a level of similarity may include determining whether a first operation performed by the computer system is found in a workflow, determining whether one or more operations performed by the computer system before or after performing the first operation are also found in the workflow, determining whether the workflow includes any operations that are not performed by the computer system, determining whether the workflow does not include any operations that are performed by the computer system, determining whether the workflow does not include any operations within a subset of operations performed by the computer system (e.g., those operations surrounding the first operations, a group of operations that are frequently performed together on the computer system, etc.), determining if the conditions for an operation performed by the computer system are the same or similar to the conditions for performing a corresponding operation found in a workflow, etc. In determining a level of similarity, as an example, the workflow publishing server 110 shown in FIG. 1 may leverage one or more machine learning. The threshold may be set by a user. The threshold may be set to, for example, 60%, 70%, 80%, or 90% similarity.

The process 300 optionally includes receiving data, from the computer system, indicating errors or conditions of a server system, identifying one or more workflows of the multiple workflows that are configured to address the errors or conditions, and providing, to the computer system, the workflow or a recommendation for the workflow. As an example, the data may include usage logs, error reports, error logs, and/or server manager logs. In identifying one or more workflows, as an example, the workflow publishing server 110 may leverage one or more machine learning.

The process 300 optionally includes receiving a query from the computer system, determining a workflow of the multiple workflows based on the query, and providing, to the computer system, the workflow or a recommendation for the workflow in response to receiving the query. As an example, a query may be or include a request for a catalog of available workflows, a request for one or more identified workflows, a request for compatible or recommended workflows, etc. The query may include, for example, an indication of one or more specific workflows. The query may include, for example, one or more criteria for workflows that are to be used in identifying one or more workflows to be sent to the computer system in response. The query may include information corresponding with the computer system such as configuration settings of the computer system. In some cases, the query may be include a request for documents, e.g. from the workflow publishing server 110 shown in FIG. 1. In these cases, the workflow publishing server 110 may identify one or more workflows that correspond with the requested documents, and may send the identified one or more workflows to the computer system or may send a recommendation including an indication of the identified workflows to the computer system.

A computer system enables administrators of a computing environment to author workflows to be performed automatically by one or more computers. The system can enable users to introduce operations that involve communicating with one or more users, or modify existing operations so that they involve communicating with one or more users. As examples, an operation may request user input or notify one or more users. The workflow may require that performance of an operation is conditional on receiving user input or satisfying another condition.

In authoring an automated workflow, administrators may specify that communication should occur with, for example, a specific user, one or more users having a specified title, or a group of users having a specified permission level. In authoring an automated workflow, administrators may specify that a message is to be sent to a named or otherwise specified user, one or more users having a specified title, or a group of users having. In authoring an automated workflow, administrators may specify the method for messaging, e.g., text, email, etc.

In general, a workflow refers to a series of computer operations. A workflow can be performed by a server system or a server environment. A workflow can be customized for a particular server or a particular server environment. A workflow can be modified by one or more system administrators. Performance of one or more operations in the set of workflow operations may be conditional on the earlier performance of a workflow operation. Performance of one or more operations in the set of workflow operations may be conditional on user interaction, user operation, and/or user input. Performance of one or more operations in the set of workflow operations may be conditional on the occurrence of particular events such as a state of a server environment, performance of the server environment, the services or software running on a server environment, the load on a server environment, the configuration of a server environment, etc. A workflow may contain alternative or branching sets of operations, where one set of operations is performed over another set based on the conditions that were satisfied.

Performance of a workflow may be initiated by a user. Alternatively, performance of a workflow may be initiated by the detection of certain conditions.

In some implementations, a workflow may be run in the background. In these implementations, the workflow may always be running. In these implementations, the workflow may be workflow for monitoring or may contain operations for monitoring. Monitoring may include monitoring for particular conditions occurring at a server, a server environment, remote computing systems, etc.

The techniques disclosed in this document allow for developing, modifying, and running workflows for complex situations that can increase the efficiency and reliability of server systems. Users, such as administrators, can develop or modify a workflow to include user interaction components. These components may call for messaging or otherwise notifying a user, requiring user input, or otherwise communicating with a user. The user may be a specific user, belong to a specific group of users, or may have a requisite security or permission level. By developing or modifying a workflow to include these user interaction components, complex operations or operations involving critical systems or services can be safeguarded. This allows for the creation of complex workflows for tasks that would normally be manually performed due to, for example, the critical systems or services involved, or due to the complexity of the tasks. Accordingly, the techniques disclosed improve efficiency by, for example, introducing fully or partially automating tasks that would normally be performed manually. The techniques disclosed also improve reliability by introducing these user interaction components into the workflows which help by, for example, notifying users, ensuring that the operation is safe by requesting confirmations or requiring approvals.

An administrator can view, modify, and/or deploy one or more workflows. For example, an administrator may perform these actions using a workflow management dashboard interface displayed by an administrator device. Examples of administrator devices include a computing devices such as a laptop computer, a desktop computer, a mobile phone, a smart phone, a tablet, a PDA, etc. Through an interface of the administrator device, the administrator may be able to view the management dashboard. Within the management dashboard, the administrator may be able to view a listing of one or more workflows. As an example, the listing of one or more workflows may be a listing of all workflows currently available to the particular system (e.g., server system). As an example, the listing of one or more workflows may be listing of workflows currently available to the particular system and available for download from a remote system. As an example, there may be a first listing of one or more workflows of workflows currently available to the particular system and a second listing of one or more workflows available for download from a remote system. As an example, the listing of one or more workflows may be workflows associated with a particular server or server environment. In this example, the administrator may specify the particular server or server environment (e.g., through a drop-down menu or a field).

The management dashboard may also provide the administrator access to notifications, an internal inbox or messaging service, a status of one or more servers or server environments, usage data of one or more servers or server environments, current or historical performance data of one or more servers or server environments, etc.

Figure 4:
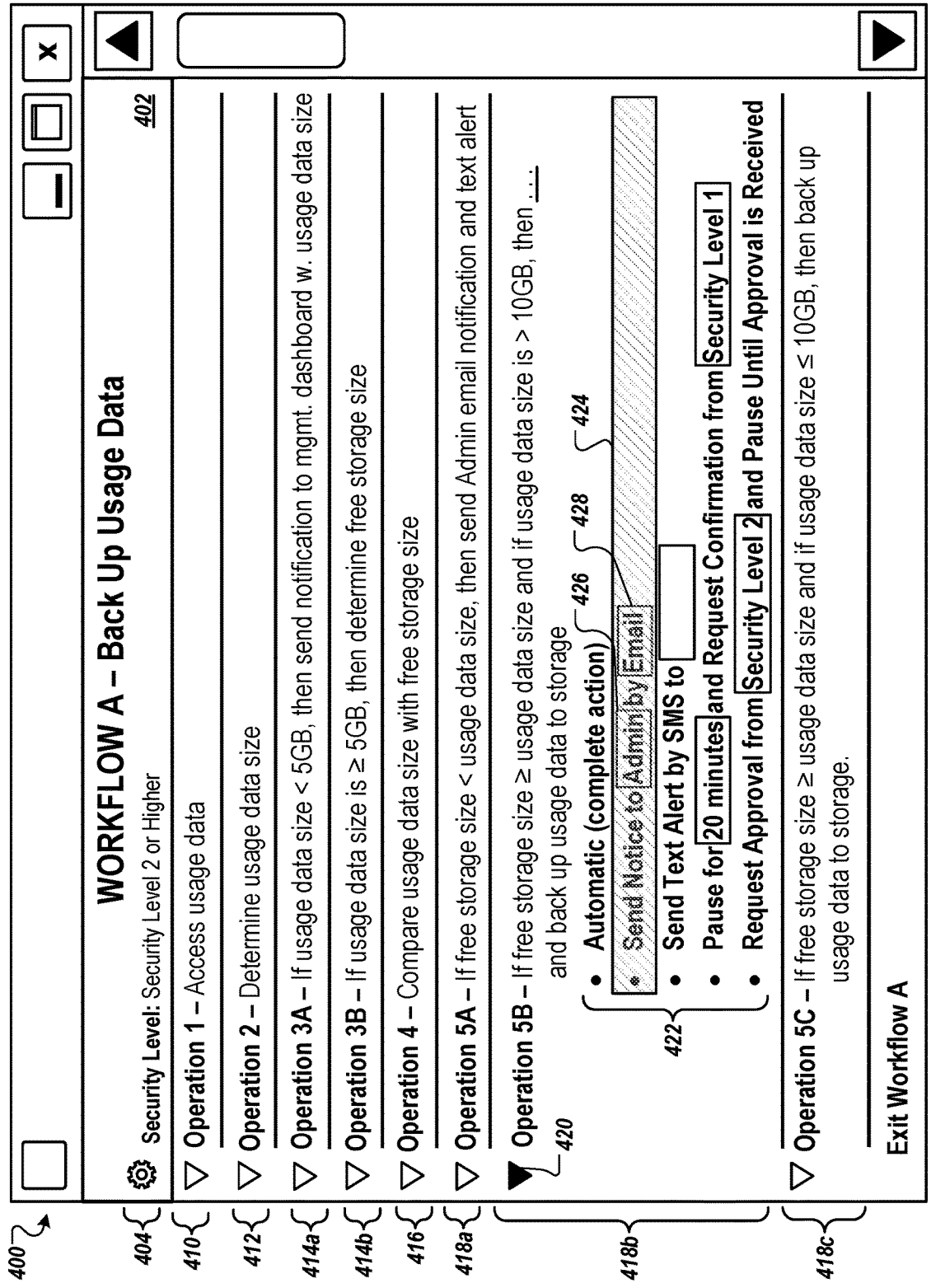
FIG. 4 is an example interface for displaying and editing a workflow.

When an administrator selects a particular workflow, the administrator may be presented an interface to view, modify, and/or deploy the particular workflow. For example, the administrator may be able to select a particular workflow from the listing of workflows within the management dashboard. As an example, the administrator may be presented with the interface 400 shown in FIG. 4 for a workflow 402 ("Workflow A") in response to the administrator selecting the workflow 402 from a listing of workflows.

As shown in the interface 400, an administrator may be able to view each of the operations 410-418c within the workflow 402. Performance of one or more operations may be may be contingent on the successful performance of an earlier operation. For example, an operation 412 ("Operation 5") to determine usage data size may be contingent on performing an operation 410 ("Operation 1") to access usage data. The performance of a number of operations within the workflow 402 are contingent on one or more conditions being met. For example, performance of an operation 414a ("Operation 3A") is contingent on the usage data size being less than 5 GB. A number of operations within the workflow 402 defines separate branches defining separate operational paths that the workflow 402 can take. For example, the condition of the operation 414a requiring the usage data size to be less than 5 GB is mutually exclusive with the condition of an operation 414b ("Operation 3B") requiring the usage data size to be greater than or equal to 5 GB. Accordingly, in a single performance cycle of the workflow 402, only the operation 414a or the operation 414b can be performed but not both.

The operations within the workflow 402 include the operation 410. The operation 410 is an operation to access usage data. Usage data may include be usage data associated with a server or a server environment. Usage data may be current usage data or historical usage data, e.g. usage data collected since last back up of usage data. Usage data may include an indication of the current or historical CPU utilization for, for example, a server or a server environment. Usage data may include an indication of the current or historical memory, e.g., RAM, utilization for, for example, a server or a server environment. Usage data may include an indication of current or historical disk space utilization for, for example, a server or a server environment. Usage data may include an indication of current or historical load on, for example, the server or server environment. Usage data may include data associated with current users or past users, e.g. users since last back up. Usage data may include various diagnostic data. Usage data may be stored on, for example, a server's data storage.

The operations within the workflow 402 further include the operations 412-414b. The operation 412 is an operation to determine usage data size. The operation 414a is an operation to send a notification to a management dashboard with the usage data size if the usage data size is less than 5 GB. The operation 414b is an operation alternative to the operation 414a. The operation 414b is an operation to determine the free storage size. The storage is a storage different than the storage where the usage data is currently being stored, though past usage data may be stored on the storage. The storage may be storage on a server associated with the usage data, such as a different disk. The storage may be external or remote with respect to a server associated with the usage data. The free storage size may be, for example, an amount of remaining storage on the data storage. The free storage size may be, for example, an amount of remaining storage of storage allocated for storing usage data.

The operations within the workflow 402 further include an operation 416. The operation 416 ("Operation 4") is an operation to compare the usage data size with the free storage size.

The operations within the workflow 402 further include the operations 418a-418c. An operation 418a ("Operation 5A") is an operation to send one or more administrators an email notification and a text alert if the free storage size is less than the usage data size. The notification and/or text alert may include an indication that there is not enough free storage size to back up the usage data. This notification and text alert may be helpful to raise the issue to the one or more administrators who can then, for example, clear up additional free storage space, allocate more free storage space, and/or select a new storage for future usage data backups. The operation 418a may also include an element to exit the workflow 402 since a back up to the storage would not be possible. An operation 418b ("Operation 5B") is an operation alternative to the operation 418a and is currently being edited by the administrator. Currently, the operation 418b is an operation to send a notification to one or more administrators by email and to back up the usage data if the free storage size is greater than or equal to the usage data size and if the usage data size is greater than 10 GB. This notification may be helpful to notify the one or more administrators that a large back up is about to take place, is currently being performed, or has been performed. An operation 418c ("Operation 5C") is an operation alternative to the operation 418a and the operation 418b. The operation 418c is an operation to back up the usage data to the storage if the free storage size is greater than or equal to the usage data size and if the usage data size is less than or equal to 10 GB. Under the conditions of the operation 418c, because the backup can occur without issue and because the backup is relatively small, it may be considered unnecessary to notify administrators or other users.

An administrator may be able to modify a workflow such as the workflow 402. In modifying a workflow, the administrator may be able to add one or more operations to the workflow. For example, the administrator may be able to add one or more operations in addition to the existing operations 410-418c. In modifying a workflow, the administrator may be able to remove one or more operations from the workflow's existing operations. For example, the administrator may be able to remove one or more operations from the operations 410-418c. In this example, the administrator may replace the one or more removed operations with one or more new operations.

An administrator may be able to modify individual operations within a workflow such as the workflow 402. In modifying an individual operation within a workflow, the administrator may be able to add one or more conditions to an operation. For example, the administrator may have added the condition of requiring the usage data size to be less than 5 GB in order to perform the operation 414a. Similarly, an administrator may be able to remove, replace, or modify a condition of a particular operation.

In modifying an individual operation, the administrator may be able to add, replace, or modify one or more elements of an operation. In adding, replacing, or modifying the one or more elements of an operation, the administrator may be presented a list of elements to choose from. This list of elements may be composed of or include preexisting elements. The administrator may be able to modify the elements within the preexisting list of elements. In modifying the elements, the administrator may be able to specify specific users, a group of users, e.g., administrators, developers, managers, etc., security or permissions levels, e.g., full control permission, read/write or modify permission, read or view permission, etc., identification information of one or more users, e.g., names, employee ID's, etc., contact information of one or more users, e.g., one or more phone numbers, one or more emails, etc., or messaging methods or platforms, e.g., SMS text, email, dashboard notification, etc. The administrator may be able to make modifications to elements through, for example, one or more dropdown menus, one or more text fields, or a combination of dropdown menus and text fields.

For example, when an administrator selects the button 420 in the interface 400, the administrator is presented with a list 422 of elements. Whichever element from the list 422 of elements is selected will be used to fill in a first element of the operation 418b where the second element is to back up the usage data to the storage. As shown, an element 424 has been selected. The element 424 provides for sending a notification to administrators by email. The element 424 includes a first field 426 and a second field 428 that the administrator can modify. The first field 426 is a field for a group of users and is currently set to "admin", meaning that the group of users is consists of users who are designated as administrator. The administrator may have entered "admin" where, for example, the first field 426 is a text field. The administrator may have selected "admin" from a list of user groups where, for example, the first field 426 corresponds with a dropdown menu. The second field 428 is a field for a method of messaging and currently is set to "email" as the method of messaging. The administrator may have entered "email" where, for example, the second field 428 is a text field. The administrator may have selected "email" from a list of messaging methods where, for example, the second field 428 corresponds with a dropdown menu. The administrator may be able to enter or select other messaging methods such as internal inbox, a management dashboard notification, a text message, etc.

As shown, the list 422 of elements includes elements other than the selected element 424. The elements in the list 422 may have been preexisting and automatically retrieved. The elements in the list 422 may have been previously generated by the administrator or by another user. The list 422 includes an element to automatically complete the operation 418*b* without user input or interaction. The list 422 includes an element to send a text alert by short message services (SMS) to a currently unspecified user or group of users. The list 422 includes an element to pause (e.g., a breakpoint) for 20 minutes and request confirmation from a user having a security or permission level of "Security Level 1". This element contains a time field where the value of 20 minutes has been entered or selected, and a security or permission level field where "Security Level 1" has been entered or selected. As an example, if this element were selected and if performance of the operation 418*b* were initiated, a request would be sent to one or more users having a security or permission level of "Security Level 1" and further performance of the operation 418*b* would be paused for up to 20 minutes. Performance of the operation 418*b* and the workflow 402 would resume upon receipt of a confirmation from a user having a security or permission level of "Security Level 1", or would resume automatically if 20 minutes have passed since the operation 418*b* was paused. The list 422 includes an element to request approval from a user having a security or permission level of "Security Level 2" and pause until approval is received. As an example, if this element were selected and if performance of the operation 418*b* were initiated, a request would be sent to one or more users having a security or permission level of "Security Level 2" and further performance of the operation 418*b* would be paused until approval is received. Performance of the operation 418*b* and the workflow 402 would resume only upon receipt of an approval from a user having a security or permission level of "Security Level 2". In this example, performance of the workflow 402 may automatically terminate if approval is not received within a specified amount of time, e.g., 30 minutes, one hour, two hours, six hours, 12 hours, 1 day, etc.

An administrator may be able to add, modify, or remove conditions associated with an element of an operation. For example, an administrator may be able to add one or more conditions to one or more of the elements in the list 422. The administrator may add a condition to the element 424 so that the element 424 provides sending a notice to an administrator by email if the local time is between 9:00 AM and 5:00 PM. If the added condition applied to the element 424 is not met, the workflow 402 may either ignore the element and continue performing operation 418*b* (e.g., so that the usage data is backed up to storage automatically), may select an alternative element from the list 422 if one has been labelled (e.g., by an administrator) as being an alternative, may cancel performing the operation 418*b* (e.g., so that the usage data is not backed up) and may proceed to performing the next operation in the workflow 402 if any, may cancel performing the operation 418*b* and terminate performance of the workflow 402, or may cancel performing the operation 418*b* and restart performance of the workflow 402. The administrator may add a new element and label it as an alternate element with respect to the element 424 with the added condition. For example, the alternate element may provide that where the local time is not between 9:00 AM and 5:00 PM a notice is sent to the administrator by text message. Alternatively, the administrator may further modify the element 424 so that the element 424 provides sending a notice to an administrator by email if the local time is between 9:00 AM and 5:00 PM, else, if the local time is not between 9:00 AM and 5:00 PM, sending a text message to an administrator by text message.

An administrator may be able to add, modify, or remove one or more elements that are independent from a particular operation. For example, an administrator may add a pause (e.g., a breakpoint) element in the workflow 402. The administrator may specify when the element should be performed by, for example, specifying its placement among the operations of 410-418*c*. For example, the administrator may place the pause element between the operation 412 and the operation 414, thereby providing for the pause element to be performed after the operation 412 is performed.

An administrator may be able to make one or more elements conditional on one or more existing operation conditions. For example, an administrator may be able to make an element conditional on the condition that usage data size is less than 5 GB of the operation 414*a*. As another example, an administrator may have made each of the elements in the list 422 conditional on the conditions of the operation 418*b*, e.g., conditional on the free storage size being greater than or equal to the usage data size and the usage data size being greater than 10 GB.

"Security Level 1" may correspond, for example, with a group of users designated with full control permission, a group of users designated with read/write or modification permission, a group of users consisting of administrators and developers, a group of users consisting only of administrators, a group consisting only of developers, a group consisting of developers and managers, a group consisting only of managers etc. "Security Level 2" may correspond, for example, with a group of users different than the group of users having a security or permission level of "Security Level 1". "Security Level 2" may correspond, for example, with a group of users designated with full control permission, a group of users designated with read/write or modification permission, a group of users consisting of administrators and developers, a group of users consisting only of administrators, etc. "Security Level 2" may be considered a higher security or permission level than "Security Level 1" such that approval or confirmation from a user having a "Security Level 2" security or permission level would be preferred over approval or confirmation from a user having a "Security Level 1" security or permission level, especially for operations that involve critical systems or services. One or more users may have both a "Security Level 1" security or permission level and "Security Level 2" security or permission level. Every user having a "Security Level 2" security or permission level may also inherently have a "Security Level 1" security or permission level.

In adding, replacing, or modifying the one or more elements of an operation, the administrator may create a customized element.

In some implementations, a security or permission level is considered a group of users consisting of users having the security or permission level.

The administrator may also add or modify a condition associated with the workflow 402 in order to run the workflow 402. The condition may require that the workflow 402 can only be run by one or more specified users, one or more groups of users, or users having a specified security or permission level. For example, as shown, the workflow 402 has a security or permission level 404. The security or permission level 404 is set to "Security Level 2 or higher" meaning, for example, that a user must have a security or permission level of at least "Security Level 2" in order to initiate performance of the workflow 402.

In some implementations, users, besides administrators, may be able to modify a workflow. These other users may consist of developers, managers, executives, users having read/write or modify access, etc. However, these other users may be limited to which workflows they can modify or may be limited by the extent to which they can modify a workflow. For example, these other users may be able to modify only those workflows which they created or helped create, e.g., the workflows which they are designated the owner. As another example, a developer may be limited to modifying workflows associated with applications, projects, or areas for which they are designated a developer. For example, if a particular user is a developer for server performance applications, the user may be limited to modifying workflows that deal with monitoring or analyzing server or server environment performance. The system or system users may determine if a workflow is associated with a particular application, project, or area based on metadata associated with the workflow. This metadata may include, among other things, a description of the workflow and/or the issue that workflow is trying to solve.

Figure 5:
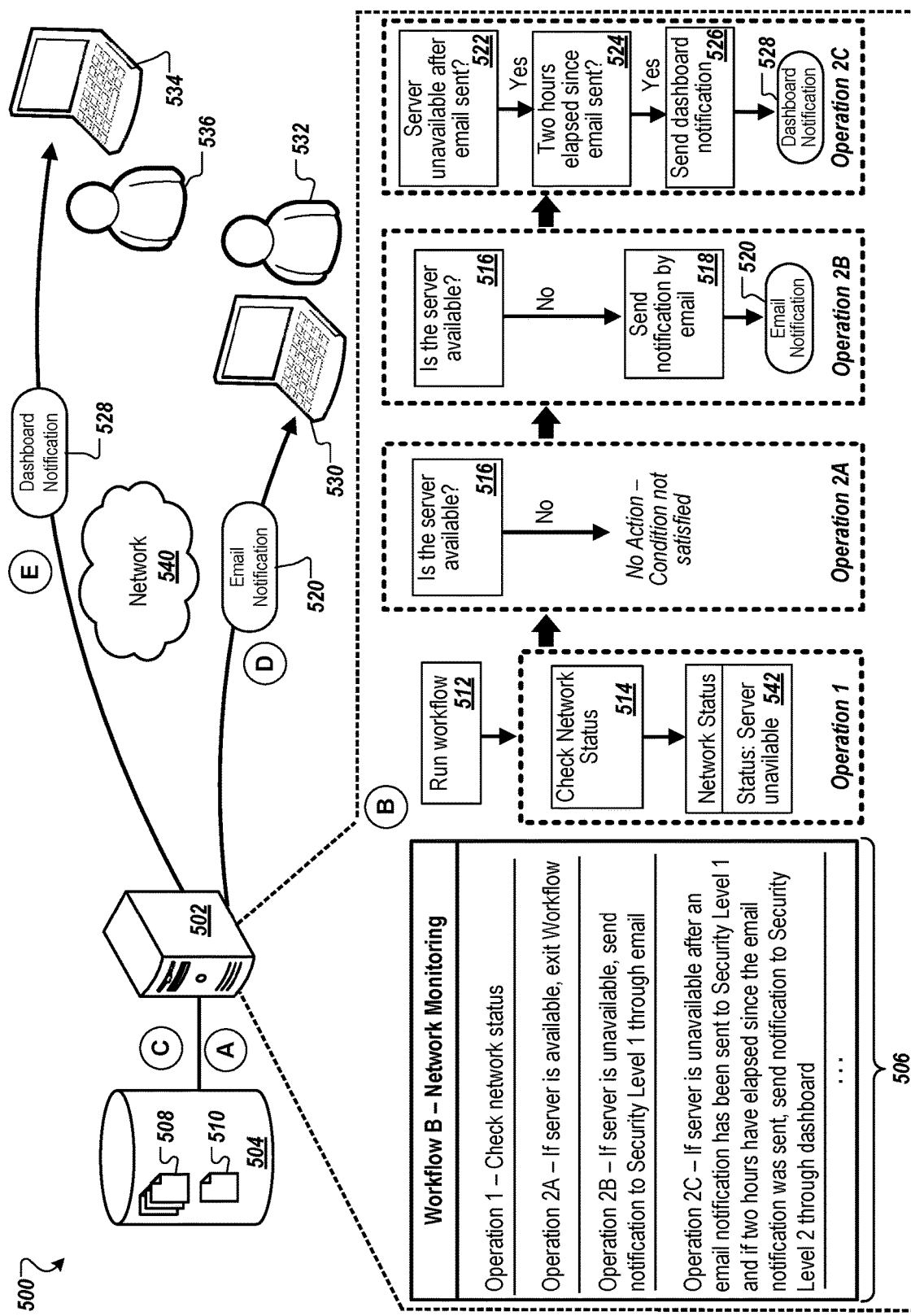
FIG. 5 is a diagram that illustrates an example system for illustrating operation of a workflow that can selectively cause interaction with a user.

In generating a notification, a text message or alert, or other type of message to send to a user, a group of users, or one or more users having a particular security or permission level, the system (e.g., the system 500 as shown in FIG. 5) may refer to a database of users and/or to an access control list (ACL) for all the workflows or for the workflow 402. The database of users may be on-premises or may be external. If external, the system may use an application programming interface (API) to access the database of users. The database of users or the ACL may include, for example, a name for each of the users, an identification for each of the users, e.g. an employee ID, contact information for each of the users, e.g., one or more telephone numbers, email addresses, etc., one or more security or permission levels associated with the user, and/or one or more groups that the user belongs to, e.g., administrator, developer, manager, executive, everyone, etc. For example, in performing the operation 418b, the system may refer to the database of users, identify all users who belong to the administrator group, and obtain email addresses for each of the identified users. The system may generate a notification and send the notification by email to each of the obtained email addresses. The system may generate a separate notification if, for example, no email was found for one or more of the identified users. This notification may be a request to update the contact information for those one or more identified users.

In determining whether a particular condition of an operation of a workflow is met, the system (e.g., the system 500 as shown in FIG. 5) may use an API to access data from external systems. For example, if the storage is an external storage such as cloud storage, the system may use an API in the performance of operation 414b in determining the free storage size.

FIG. 5 depicts a diagram that illustrates an example system 500 for using an automated workflow. As discussed above, the workflow may enable or permit selective communication or other interaction with a human user, depending on results of operations in the workflow. The system 500 includes a server 502 having a data storage 504. The system 500 is able to interact with various users over a network 540. The server 502 can run various workflows having operations that include human interaction aspects.

FIG. 5 also illustrates a flow of data, shown as stages (A) to (D), with each representing a step in an example process. Stages (A) to (D) may occur in the illustrated sequence, or in a sequence that is different from the illustrated sequence. For example, some of the stages may occur concurrently.

A user device 530 can be a device. The user device 530 can be a computing device, such as a desktop computer, a laptop computer, a mobile phone, a smart phone, a personal digital assistants (PDA), a tablet computer, or other computing devices. The user device 530 can receive information from and/or communicate with the server 502 over, for example, the network 540.

A user device 534 can be a device. The user device 534 can be a computing device, such as a desktop computer, a laptop computer, a mobile phone, a smart phone, a personal digital assistants (PDA), a tablet computer, or other computing devices. The user device 534 can receive information from and/or communicate with the server 502 over, for example, the network 540.

The network 540 can include public and/or private networks and can include the Internet.

The server 502 may contain one or more computing devices. The server 502 can send information to and/or communicate with the user device 530 and the user device 534 over the network 440. In some implementations, the server 502 may communicate with remote servers or other external devices through application programming interfaces. The server 502 may be part of a cloud computing platform (e.g., Amazon Web Services (AWS), Microsoft Azure, and so on).

The data storage 504 includes a set of workflows 508 and user information 510. The user information 510 may be a file containing user information such as a name for each of the users, an identification for each of the users, e.g. an employee ID, contact information for each of the users, e.g., one or more telephone numbers, email addresses, etc., one or more security or permission levels associated with the user, and/or one or more groups that the user belongs to, e.g., administrator, developer, manager, executive, everyone, etc. The user information 510 may be an ACL applied to all of the workflows in the set of workflows 508, or to one or more of the workflows in the set of workflows 508.

In stage (A), the server 502 accesses the data storage 504 to retrieve a workflow 506 from the set of workflows 508. The workflow 506 is a workflow to monitor a network. The server 502 may retrieve the workflow 506 automatically. The server 502 may retrieve the workflow 506 in response to an instruction from a user, such as an administrator.

In stage (B), the server 502 runs the workflow 506 (512). The server 502 may run the workflow 506 upon retrieving it from the data storage 504. The server 502 may wait to run the workflow 506 until it receives approval or confirmation from a user. The user may need to belong to a particular group, e.g. the administrator group, or may need to have a particular or high enough security or permission level in order to approve or conform the running of the workflow 506.

Upon running of the workflow 506 (512), performance of the first operation ("Operation 1") is initiated. Accordingly, the server 502 checks the network status (514). The network may be 540 or may be a different network. The network may be hosted by the server 502 or may be hosted by an external server, such as a third-party server. Here, the server 502 obtains the network status 542 which indicates the server hosting the network is unavailable. Performance of Operation 1 is now complete.

Due to Operation 1 having been performed, performance of a second operation ("Operation 2A") is initiated. Unlike Operation 1, Operation 2A is conditional. Here, Operation 2A is conditional on a determination that the server is available. The server 502 determines if the server is available (516) by, for example, analyzing the obtained network status 542. Because the network status 542 indicates that the network is not available, the condition for performing the Operation 2A is not satisfied. Accordingly, performance of Operation 2A is terminated such that no further action is taken.

Due to Operation 1 having been performed, and, in some implementations, due to Operation 2A not having been performed, performance of a third operation ("Operation 2B") is initiated. Operation 2B is conditional. Here, Operation 2B is conditional on a determination that the server is unavailable. The server 502 determines if the server is available (516) by, for example, analyzing the obtained network status 542. Because the network status 542 indicates that the network is not available, the condition for performing the Operation 2B is satisfied. Accordingly, performance of Operation 2B continues, which results in sending a notification to users having a security or permission level of "Security Level 1" by email (518).

In stage (C), prior to sending the notification to users having a security or permission level of "Security Level 1" by email, the server 502 first generates one or more email notifications including an email notification 520. In generating the one or more email notifications including an email notification 520, the server 502 obtains the user information 510. With the user information 510, the server 502 identifies users having a security or permission level of "Security Level 1" and obtains at least the email addresses of those identified users. The server 502 may also obtain other information associated with the identified users, such as their names or employee IDs, and incorporate that information into the one or more email notifications. Here, the server 502 identifies the user 532 as a user having a security or permission level of "Security Level 1" and obtains the email address for the user 532 using the user information 510.

In stage (D), using the obtained email address for the user 532, the server 502 sends the email notification 520 to the user 532 by email (518). The email notification 520 may be sent over the network 540. The user 532 may access the email through the user device 530. Performance of Operation 2B is now complete.

Due to Operation 1 having been performed, and, in some implementations, due to Operation 2A not having been performed, performance of a fourth operation ("Operation 2C") is initiated. Operation 2C is conditional. Here, Operation 2C is conditional on (i) a determination that the server is unavailable after the email notification 520 has been sent and (ii) a determination that two hours have elapsed since the email notification 520 was sent. The server 502 determines if the server is unavailable since sending the email notification 520 (522) by, for example, checking the network status again and analyzing the new network status. Here, the new network status indicates the network is not available. Because the network is not available, the first condition for performing the Operation 2C is satisfied. Next, the server 502 determines if two hours elapsed since the email notification 520 was sent (524) by, for example, comparing a current time with a time stamp associated with the sent email notification 520. Here, the server 502 determines that two hours have elapsed since the email notification 520 was sent. Because the two hours have elapsed, the second condition for performing the Operation 2C is satisfied. Accordingly, performance of Operation 2C continues, which results in sending a dashboard notification 528 to users having a security or permission level of "Security Level 2" through a management dashboard (518).

Prior to sending the dashboard notification to users having a security or permission level of "Security Level 2", the server 502 first generates one or more dashboard notifications including the dashboard notification 528. In generating the one or more dashboard notifications including the dashboard notification 528, the server 502 uses the previously obtained user information 510 to identify users having a security or permission level of "Security Level 2" and obtains the names, the employee IDs, or other identifiers of the identified users. The server 502 may incorporate this information into the one or more dashboard notifications. The server 502 may use this information, or use other information within the user information 510, to identify a dashboard associated with each of the identified users. The server 502 may post each of the one or more dashboard notifications including the dashboard notification 528 to a corresponding dashboard. Here, the server 502 identifies the user 536 as a user having a security or permission level of "Security Level 2" and obtains a name, an employee ID, or another identifier of the user 536. Using this information, the server 502 generates and posts the dashboard notification 528 to a dashboard associated with the user 536.

In stage (E), the server 502 sends the dashboard notification 528 to the user 536 (526). Sending the dashboard notification 528 may occur automatically. For example, the dashboard notification 528 may be sent automatically once the dashboard notification 528 is posted to the dashboard associated with the user 536. The dashboard notification 528 may be sent once the user 536 accesses or logs into their dashboard through the user device 534. Once the user 536 receives the dashboard notification 528, performance of Operation 2C is complete.

In generating communications, including notifications, the server 502 may look up information associated with the intended recipients. The server 502 may access information associated with an intended recipient and may use the accessed information to send a generated communication to the recipient. The information associated with an intended recipient may include, for example, one or more email addresses, one or more usernames, one or more phone numbers, etc. The information associated with an intended recipient may be stored on the data storage 504 or may be stored on a separate database accessible by the server 502. The type of information accessed by the server 502 may depend on the type of communication generated. For example, because the server 502 generated an email notification 520 for the user 532, the server 502 may look up an email address of the user 532 and use that email address to send the email notification 520 to the user 532. Similarly, because the server 502 generated a dashboard notification 528 for the user 536, the server 502 may look up a username of the user 532 and use that username to send the dashboard notification 528 to the user 536.

The workflow 506 may contain additional operations. These additional operations may be conditional on the successful performance of one or more operations of Operations 1-2C. These additional operations may be conditional on non-performance of one or more operations of the Operations 1-2C.

The workflow 506 may continue to run in the background of the server 502 and continuously or periodically monitor the network. For example, once the server 502 has gone through each of the operations within the workflow 506, the workflow 506 may be run again starting with Operation 1 in order to continuously monitor the network. As another example, if an operation within the workflow 506 calls for exiting or ending the workflow 506, then the workflow 506 may be run again starting with Operation 1 in order to continuously monitor the network. This may occur, for example, when the Operation 2A is fully performed. That is, if it were determined that the server was available, Operation 2A would be performed and the workflow 506 would be exited such that performance of Operations 2B-2C would not be initiated at that time. However, the workflow 506 may be immediately, or substantially immediately, run again starting with initiating performance of the Operation 1.

The workflow 506 may continue to run in the background of the server 502 and periodically monitor the network. For example, once the server 502 has gone through each of the operations within the workflow 506, the workflow 506 may be run again starting with the Operation 1 after a threshold time has passed in order to periodically monitor the network. As another example, if an operation within the workflow 506 calls for exiting or ending the workflow 506, then the workflow 506 may be run again starting with Operation 1 after a threshold time has passed in order to periodically monitor the network. This threshold time may be an amount of time since the workflow 506 was last run, e.g. since performance of Operation 1 is initiated, an amount of time since the workflow 506 last checked the network status, an amount of time since the workflow 506 ended, e.g., since the server 502 has gone through each of the operations within the workflow 506 or since an operation called for exiting the workflow 506. The threshold time may be, for example, 30 seconds, one minute, five minutes, 10 minutes, 15 minutes, 30 minutes, one hour, two hours, six hours, 42 hours, 1 day, etc.

Figure 6:
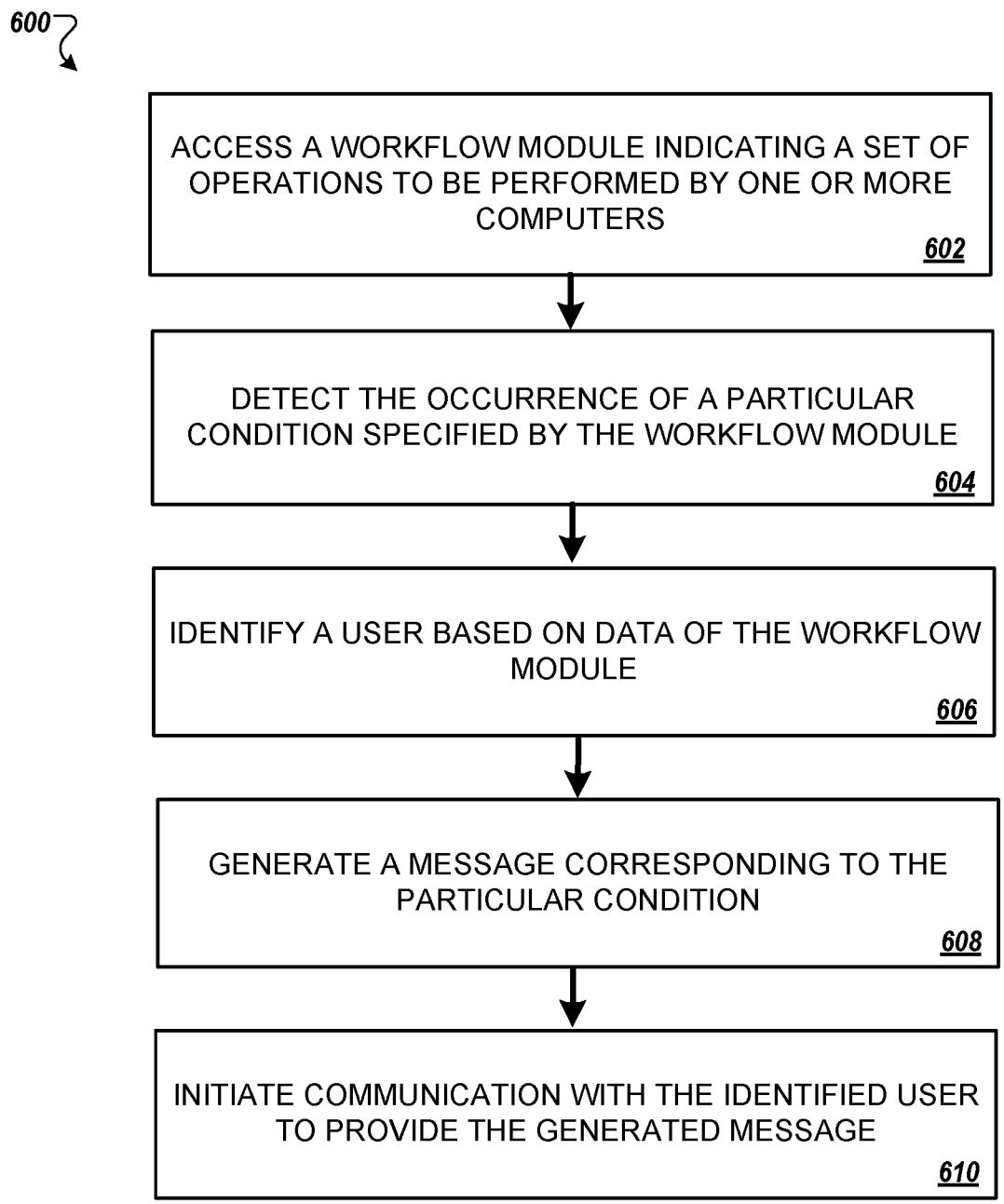
FIG. 6 is an example process for operating a workflow that can selectively cause interaction with a user.

FIG. 6 is an example process 600 for operating a workflow that can selectively cause interaction with a user. The process 600 can be performed, at least in part, using the system 100 or the system 500 described herein. For example, the process 600 can be performed by one or more computers, such as the client device 122, server 120, server 502, user device 530 or 534, etc. The process 600 can be performed by a server system, a client device, or by a combination of the two.

The process 600 includes accessing a workflow module indicating a set of operations to be performed by one or more computers (602). The workflow module may specify rules that instruct one or more actions to be selectively performed based on detection of one or more conditions. The workflow module may be a file, a combination of multiple files, a data package, or other data. As an example, with respect to FIGS. 1A-1B, the workflow module 118a may define a particular workflow, e.g., Workflow 1 for patching. The example of workflow module 118a has instructions for the client device 122 (and/or the server 120) to perform a set of operations related to patching (e.g., updating) software.

The workflow module may specify the set of operations to be performed, along with other related data, such as rules, settings, prerequisites or requirements for running the workflow, conditions for initiating the workflow, and so on. In some implementations, the workflow module may include executable code such as, an executable file or a data package containing multiple executable files. The workflow module may be executable by a computing device that is to receive the workflow module and/or that is to perform the set of operations indicated by the workflow module. For example, with respect to FIGS. 1A-1B, the workflow module 118a may be an executable file that can be executed by the client device 122 (and/or the server 120). Alternatively, the workflow module 118a may be a data package containing multiple executable files that can be executed by the client device 122 (and/or the server 120).

The workflow module may be interpretable, such as an interpretable file or data package containing multiple interpretable files. For example, with respect to FIGS. 1A-1B, the workflow module 118a may be interpretable. That is, after receiving the workflow module 118a, the client device 122 (and/or the server 120) may be capable of interpreting the contents of the workflow module 118a to perform the corresponding set of operations. As an example, the workflow module 118a may include multiple identifiers each corresponding to a particular operation. The client device 122 may use these identifiers to look up executable files to perform the operations.

Workflow modules can be accessed from local storage or from remote storage (e.g., on a cloud computing system). A computer system may receive a workflow module over a communication network, such as the Internet. A computer can access a workflow module by requesting the workflow module and receiving the workflow module. For example, with respect to FIGS. 1A-1B, the client device 122 or the server 120 can send a request for the workflow module to the workflow publishing server 110. In response, the workflow publishing server 110 may provide the requested workflow module to the server 120 and/or to the client device 122.

The process 600 includes detecting the occurrence of a particular condition specified by the workflow module (604). The occurrence of the condition can be detected as part of performance of the set of operations of the workflow module. In other words, the operations that the workflow module specifies can include operations to monitor for certain conditions, detect when the conditions occur, and take actions in response. The workflow module may be configured to initiate a communication, e.g., with one or more users (e.g., of a device performing the workflow or another device), when the particular condition occurs. The particular condition may be, for example, the successful performance of a higher order operation, such as an operation that is to be performed prior to a current operation being performed (e.g., an operation that is listed earlier in the workflow module). For example, with respect to FIG. 5, the server 502 might not perform one or more of the Operations 2A-2C until the Operation 1 is successfully performed. The particular condition may be, for example, a state condition (e.g., a triggering event or other predetermined condition). For example, with respect to FIG. 5, the Operation 2A is only performed if a particular server is available. As another example, the particular condition may be a temporal condition. For example, with respect to FIG. 5, the Operation 2C will only be performed if two hours have elapsed since an email notification has been sent.

Detecting the occurrence of the particular condition may include, for example, requesting information and/or receiving information. For example, with respect to FIG. 5, the server 502 may request a network status of the network 540. The server 502 may receive a response if the network 540 is working and determine that the network 540 is available, or may determine that the network 540 is not available if no response is received (or if the response indicates that it not connected to the internet or one or more other necessary computing devices). The server 502 may also detect a condition in response to receiving information. For example, the server 502 may determine that a condition is met in response to receiving an indication that an error has occurred.

The process 600 includes identifying a user based on data of the workflow module (606). Identifying the user based on data of the workflow module may be performed in response to detecting the occurrence of the particular condition. For example, an operation of the workflow module may indicate a user to communicate with. The indication of the user may include, for example, a name of the user, an email address of the user, an identifier for the user, a phone number of the user, another identifier for a device of the user, or other contact information for the user. As an example, with respect to FIG. 5, the server 502 may use the workflow 506 (e.g., a workflow module defining this workflow) to identify the user 536 in response to determining that the condition of the server being available is met, and, therefore, that the user 536 should be contacted through email.

A computer system can use information contained in the workflow module to look up the user to be contacted. For example, a computer can extract from the workflow module information such as a name of the user, an identifier for the user, an email for the user, a phone number for the user, another identifier for a device of the user, other contact information corresponding to the user, etc. A workflow module can designate a user identifier or device identifier in a data field, tag, label, or other designation. The workflow module may specify a computing device of the user that should be used to communicate with the user.

The process 600 includes generating a message corresponding to the particular condition (608). The message can be generated, e.g., by the client device 122 or the server 120 shown in FIGS. 1A-1B, in response to detecting the occurrence of the particular condition. The message may be a notification for the user. The notification may be, for example, an email notification (e.g., message), a dashboard notification, an auditory message, an alert, etc.

As an example, with respect to FIGS. 1A-1B, the client device 122 or the server 120 can generate the message by selecting a predetermined message, selecting a predetermined message from a list of multiple predetermined messages, selecting a template and filling in values for multiple fields of the template, or combining various elements together (e.g., calculated and/or observed values, predetermined phrases, the detected condition, etc.). The specific way that the client device 122 or the server 120 generates the message may depend on the settings of the client device 122 or the server 120, administrator settings (e.g., set by the administrator 104), the particular condition detected, the type of message that is to be generated (e.g., error messages are generated using an error template whereas empty trash messages are generated using a predetermined message).

As an example, in selecting a predetermined message, the client device 122 or server 120 may use the condition to identify a predetermined message. For example, if the condition provides that the user 124 should be notified once an error is detected, the client device 122 may look up a predetermined message for errors (e.g., "Error has been detected!") to send to the user 124. Information describing the error can also be provided. Similarly, in selecting a predetermined message from multiple predetermined messages (e.g., each corresponding to a particular condition and/or scenario), the client device 122 or server 120 may use the condition and/or corresponding information to identify the particular predetermined message that should be used. For example, if the condition provides that the user 124 should be notified once an error is detected, the client device 122 may determine the type of error that has occurred (e.g., "loading error") and use the type of error to a select a particular predetermined message from among multiple predetermined error messages (e.g., "A loading error has occurred!").

As another example, with respect to FIGS. 1A-1B, the client device 122 and/or the server 120 can generate a message by first selecting a template and then filling in one or more fields of the template. The template may be general for all messages or may be specific to a certain scenario (e.g., may correspond to the detected condition). For example, the client device 122 and/or the server 120 may select a template for generating error messages in response to a condition of notifying the user 124 of any errors being met. The error template may have, for example, an error field corresponding to the type of error that occurred, a temporal field corresponding to the time and/or date when the error occurred, a system field corresponding to the systems, users, or specific devices that have been or may be impacted by the error, etc. The client device 122 and/or the server 120 may generate a message for the user 124 by obtaining the information required to fill in the fields of the error template, and proceeding to fill in these fields with the obtained information.

As another example, with respect to FIGS. 1A-1B, the client device 122 and/or the server 120 can generate a message combining various elements together (e.g., calculated and/or observed values, predetermined phrases and/or predetermined words, the detected condition, etc.). The values that are to be observed and/or calculated, and the predetermined phrases and/or predetermined words may depend on the current scenario (e.g., the detected condition). For example, in response to the detected condition being the detection of an error, the client device 122 may obtain the type of error that is occurred, the time that the error has occurred, the systems, users, and/or devices that are impacted by the error, etc. as observed values. The client device 122 may proceed to calculate, for example, the estimated performance impacts of the error on the systems, users, and/or devices. Having these observed and calculated values, the client device 122 may proceed to select predetermined phrases and/or words that correspond to an error message, to this particular type of error message, and/or to the observed or calculated values. For example, if the client device 122 calculates that the estimated impact of the error on user capacity is 5% (e.g., in the range of 5% to 10%), then the client device 122 may select the phrase "There is likely to be some impact on user capacity with an estimated _____ percent reduction" and fill in the blank with the calculated "5". However, if the client device 122 calculates that the estimated impact of the error on user capacity is over 20%, then the client device 122 may select the phrase "SIGNIFICANT IMPACT ON USER CAPACITY IS ANTICIPATED!"

The generated message may be an alert that, for example, does not require user response or interaction. However, even is the message is an alert, the client device 122 or server 120 may configure the message such that they receive a read receipt upon the user 124 opening the message. Alternatively, the generated message may require a user's response or interaction. For example, the client device 122 or the server may generate the message to include one or more interactive user interface elements to receive user input. The message may request that the user 124 select the user interface element to, for example, verify that they have read the message or received the message, to approve or authorize the performance of one or more operations (e.g., which may be listed in the contents of the message and which may be one or more operations of the workflow module), to perform authentication, to reject the performance of one or more operations, to cancel a scheduled operation (e.g., restart of the client device 122), to perform an operation immediately ahead of its scheduled time (e.g., restart now instead of in ten minutes), etc. The message may include one or more field user interface elements that the user 124 may fill in. For example, the message may include a temporal field where the user 124 may enter a time and/or a date for when one or more operations (e.g., operations of the workflow module) should be performed, a password field where the user 124 must enter a password or keyword before they can authorize (or cancel) one or more operations, a comments field, an instructions field, etc. The messages may be configured so that any selections that the user 124 makes or input that the user 124 provides using the interface elements of the message may be sent back to the client device 122 and/or the server 120.

The process 600 includes initiating communication with the identified user to provide the generated message (610). The message can be provided in response to detecting the occurrence of the particular condition. Initiating communication with the identified user may include sending the generated message to a device of the user, e.g., over a network. In some cases, the message can be provided through for display through an application, a web page, a web application, a SMS text message, an e-mail message, a mobile device notification, a phone call, etc.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
receiving, by the one or more computers, a workflow module over a communication network, wherein the workflow module is a distributable package comprising executable or interpretable instructions configured to monitor operation of a server environment and selectively alter operation of the server environment after detection of a particular condition occurs for the server environment, and wherein the workflow module specifies that one or more operations of the workflow to be performed that are dependent on a second condition being satisfied after the detection of the particular condition of the server environment, the workflow module being provided from a library of workflow modules comprising workflow modules to monitor and manage operation of server environments;
after receiving the workflow module of the communication network, performing, by the one or more computers, operations specified by the received workflow module including a set of operations to determine and evaluate a state of a particular server environment, the received workflow module specifying rules that instruct one or more actions to be selectively performed based on detection of one or more conditions based on the state of the particular server environment;
detecting, by the one or more computers and as part of performance of the set of operations of the received workflow module, the occurrence at the particular server environment of the particular condition specified by the received workflow module;
in response to detecting the occurrence of the particular condition specified by the received workflow module:
causing, by the one or more computers and based on the received workflow module, a change to a user interface to present one or more interactive user interface elements; and
monitoring, by the one or more computers, to determine whether the second condition has been satisfied; and
in response to determining based on the monitoring that the second condition has been satisfied, altering, by the one or more computers, operation of the server environment by performing the one or more operations of the workflow that are dependent on the second condition being satisfied.

2. The method of claim 1, wherein the particular condition is that a performance measure for the operations of the workflow module is below a threshold level.

3. The method of claim 1, wherein the particular condition is that a performance measure for the one or more computers is below a threshold level.

4. The method of claim 1, wherein the workflow module is configured to run periodically or on an ongoing basis to detect and address one or more aspects of operation of a computer system.

5. The method of claim 1, wherein the workflow module is editable by a user to alter (i) the particular condition, (ii) a type of interaction with the user, or (iii) a set of users with which that communication is initiated.

6. The method of claim 1, wherein the workflow module is editable by a user to insert or remove, in the set of operations, an element configured to cause the one or more computers to initiate communication with a user based on data generated by the workflow module.

7. The method of claim 6, wherein the set of operations is a sequence of multiple operations;
wherein the element is a breakpoint element that is insertable into the sequence of operations such that running the workflow module causes the one or more computers to:

perform first operations occurring in the sequence of operations before the breakpoint element; and after performing the first operations:
initiate communication with a user before performing second operations that occur after the breakpoint element in the sequence of operations; and pausing or cancelling processing of the second operations.

8. The method of claim 1, wherein the workflow module includes a rule configured to require approval of a user before proceeding with at least a portion of the set of operations; and wherein the method further comprises, based on the rule, pausing execution of the set of operations of the workflow module in response to detecting the occurrence of the particular condition.

9. The method of claim 1, wherein the workflow module includes a rule that specifies a predetermined amount of time to wait for approval to be received from a user;

wherein the method further comprises:
pausing the operations of the workflow for predetermined amount of time; and after the end of the predetermined amount of time, resuming execution of the operations in the set of operations.

10. The method of claim 1, further comprising:

accessing data from a database system indicating a set of users and their permission levels;

selecting a proper subset of the users such that each user in the proper subset has at least a minimum permission level; and initiating communication with one or more of the users in the selected subset in response to detecting the particular condition.

11. The method of claim 1, wherein the workflow module specifies different types or levels of user interaction to be initiated depending on one or more conditions detected; or wherein the workflow module specifies different users to communicate with depending on one or more conditions detected interaction with different users.

12. The method of claim 1, wherein detecting the occurrence of the particular condition comprises executing an operation specified by the workflow module that causes the one or more computers to obtain information through a third-party application programming interface (API).

13. The method of claim 1, wherein the workflow module includes (i) a first set of operations configured to detect whether the particular condition is satisfied, and (ii) a second set of operations triggered in response to detection of the particular condition, wherein the second set of operations are configured to alter server environment settings selectively depending on whether the second condition is satisfied.

14. A system comprising:
one or more computers; and
one or more computer-readable media storing instructions that, when executed, cause the one or more computers to perform operations comprising:
receiving, by the one or more computers, a workflow module over a communication network, wherein the workflow module is a distributable package comprising executable or interpretable instructions configured to monitor operation of a server environment and selectively alter operation of the server environment after detection of a particular condition occurs for the server environment, and wherein the workflow module specifies that one or more operations of the workflow to be performed that are dependent on a second condition being satisfied after the detection of the particular condition of the server environment, the workflow module being provided from a library of workflow modules comprising workflow modules to monitor and manage operation of server environments;

after receiving the workflow module of the communication network, performing, by the one or more computers, operations specified by the received workflow module including a set of operations to determine and evaluate a state of a particular server environment, the received workflow module specifying rules that instruct one or more actions to be selectively performed based on detection of one or more conditions based on the state of the particular server environment;

detecting, by the one or more computers and as part of performance of the set of operations of the received workflow module, the occurrence at the particular server environment of the particular condition specified by the received workflow module;

in response to detecting the occurrence of the particular condition specified by the received workflow module:
causing, by the one or more computers and based on the received workflow module, a change to a user interface to present one or more interactive user interface elements; and monitoring, by the one or more computers, to determine whether the second condition has been satisfied; and in response to determining based on the monitoring that the second condition has been satisfied, altering, by the one or more computers, operation of the server environment by performing the one or more operations of the workflow that are dependent on the second condition being satisfied.

15. The system of claim 14, wherein the particular condition is that a performance measure for the operations of the workflow module is below a threshold level.

16. One or more non-transitory computer-readable media storing instructions that, when executed by one or more computers, cause the one or more computers to perform operations comprising:

receiving, by the one or more computers, a workflow module over a communication network, wherein the workflow module is a distributable package comprising executable or interpretable instructions configured to monitor operation of a server environment and selectively alter operation of the server environment after detection of a particular condition occurs for the server environment, and wherein the workflow module specifies that one or more operations of the workflow to be performed that are dependent on a second condition being satisfied after the detection of the particular condition of the server environment, the workflow module being provided from a library of workflow modules comprising workflow modules to monitor and manage operation of server environments;

after receiving the workflow module of the communication network, performing, by the one or more computers, operations specified by the received workflow module including a set of operations to determine and evaluate a state of a particular server environment, the received workflow module specifying rules that instruct one or more actions to be selectively performed based on detection of one or more conditions based on the state of the particular server environment;

detecting, by the one or more computers and as part of performance of the set of operations of the received workflow module, the occurrence at the particular server environment of the particular condition specified by the received workflow module;

in response to detecting the occurrence of the particular condition specified by the received workflow module:
causing, by the one or more computers and based on the received workflow module, a change to a user interface to present one or more interactive user interface elements; and
monitoring, by the one or more computers, to determine whether the second condition has been satisfied; and in response to determining based on the monitoring that the second condition has been satisfied, altering, by the one or more computers, operation of the server environment by performing the one or more operations of the workflow that are dependent on the second condition being satisfied.

\* \* \* \* \*